US012025718B2

(12) United States Patent
Zhang et al.

(10) Patent No.: US 12,025,718 B2
(45) Date of Patent: Jul. 2, 2024

(54) ENTANGLED RADIOFREQUENCY-PHOTONIC SENSOR SYSTEMS AND SENSING METHODS

(71) Applicants: ARIZONA BOARD OF REGENTS OF THE UNIVERSITY OF ARIZONA, Tucson, AZ (US); GENERAL DYNAMICS MISSION SYSTEMS, INC., Fairfax, VA (US)

(72) Inventors: Zheshen Zhang, Tucson, AZ (US); Quntao Zhuang, Tucson, AZ (US); William Clark, Scottsdale, AZ (US)

(73) Assignees: Arizona Board of Regents of the University of Arizona; GENERAL DYNAMICS MISSION SYSTEMS, INC.

( * ) Notice: Subject to any disclaimer, the term of this patent is extended or adjusted under 35 U.S.C. 154(b) by 0 days.

(21) Appl. No.: 17/754,908

(22) PCT Filed: Oct. 16, 2020

(86) PCT No.: PCT/US2020/056186
§ 371 (c)(1),
(2) Date: Apr. 15, 2022

(87) PCT Pub. No.: WO2021/077041
PCT Pub. Date: Apr. 22, 2021

(65) Prior Publication Data
US 2024/0142559 A1 May 2, 2024

Related U.S. Application Data

(60) Provisional application No. 62/938,584, filed on Nov. 21, 2019, provisional application No. 62/916,692, filed on Oct. 17, 2019.

(51) Int. Cl.
*G01S 3/04* (2006.01)
(52) U.S. Cl.
CPC .................... *G01S 3/043* (2013.01)
(58) Field of Classification Search
CPC ........................................ G01S 3/043
(Continued)

(56) References Cited

U.S. PATENT DOCUMENTS

2007/0296953 A1* 12/2007 Allen .................. G01S 7/41
356/28
2017/0018061 A1* 1/2017 Meyers .................. G06T 5/50
(Continued)

OTHER PUBLICATIONS

Zhuang et al., Distributed Quantum Sensing Using Continuous-Variable Multipartite Entanglement, arXiv:1711.10459v2 [quant-ph] Mar. 27, 2018, 7 pages.
(Continued)

*Primary Examiner* — Bo Fan
(74) *Attorney, Agent, or Firm* — Cozen O'Connor

(57) ABSTRACT

A reconfigurable sensor network uses continuous-variable (CV) multipartite entangled quantum states for distributed RF sensing with uncertainties below the standard quantum limit. A CV multipartite entangled state is generated with a quantum circuit that splits a squeezed vacuum state into spatially separated optical modes that are entangled. Each optical mode is transmitted to a RF-photonic sensor that imposes, on the corresponding optical mode, a quadrature displacement based on the local properties of an RF signal. A homodyne detector then measures the quadrature displacement. A post-processor combines the measurements to estimate a global property of the RF signal, such as an angle-of-arrival. To enable distributed sensing over large distances, the RF-photonic sensors may be spatially separated by several kilometers, or more. Alternatively, the
(Continued)

RF-photonic sensors may be integrated into a single photonic system, such as a photonic integrated circuit.

20 Claims, 16 Drawing Sheets

(58) Field of Classification Search
USPC .................. 342/22, 27, 52, 104, 127, 455
See application file for complete search history.

(56) References Cited

U.S. PATENT DOCUMENTS

2017/0026175 A1   1/2017   Zhang et al.
2019/0049495 A1   2/2019   Ofek et al.

OTHER PUBLICATIONS

PCT Application No. PCT/US20/56186, International Search Report and Written Opinion dated Jan. 19, 2021, 7 pages.
Xia, Yi. et al., Demonstration of a Reconfigurable Entangled Radio-Frequency Photonic Sensor Network, Physical Review Letters 124.15, Apr. 17, 2020,p. 150502.

* cited by examiner

ENTANGLED RADIOFREQUENCY-PHOTONIC SENSOR SYSTEMS AND SENSING METHODS

CROSS-REFERENCE TO RELATED APPLICATIONS

This application is a 35 U.S.C. § 371 filing of International Application No. PCT/US2020/056186, filed on Oct. 16, 2020, which claims priority to U.S. Provisional Patent Application No. 62/916,692, filed Oct. 17, 2019, and U.S. Provisional Patent Application No. 62/938,584, filed Nov. 21, 2019. Each of these applications is incorporated herein by reference in its entirety.

BACKGROUND

Quantum sensing utilizes entanglement as a quantum resource to achieve measurement sensitivities below the standard quantum limit (SQL).

SUMMARY

Some applications of classical sensing require, or benefit from, the collective use of multiple sensors, as opposed to just a single sensor. For example, the propagation angle, or angle-or-arrival (AoA) of a radiofrequency (RF) signal may be obtained by measuring, with an array of spatially distributed sensors, the relative phase shifts of the RF signal at the different sensor locations. In another application, improved sensitivity can be obtained by measuring the same global property of an RF signal (e.g., its amplitude) at several sensors instead of just one.

Entanglement is a unique quantum resource that has been utilized to enhance the performance of several applications, including microscopy, target detection, and phase estimation. Most entanglement-enhanced sensing uses only a single sensor by entangling a probe with a local reference. While entanglement-enhanced optical sensing has been extensively explored, many sensing applications (e.g., positioning and astronomy) operate in the RF or microwave regions of the electromagnetic spectrum. At these lower frequencies, quantum illumination can increase signal-to-noise ratio (SNR), as compared to classical schemes. However, ambient noise is abundant in the RF and microwave regions, and quantum illumination is challenged by a limited operational range and quantum enhancement due to increased diffraction and a lack of efficient quantum memories.

The present embodiments utilize entanglement as a quantum resource to advantageously improve the SNR of distributed sensing measurements in the RF and microwave regions. The embodiments feature a quantum circuit that generates, from a single squeezed vacuum state, a plurality of spatially separated and entangled optical modes. These modes collectively define a continuous-variable (CV) multipartite entangled state that is more robust against loss, as compared to a discrete-variable multipartite entangled state. Each of the optical modes may then be transported to one of a plurality of spatially separated RF-photonic sensors. These sensors may be separated by several kilometers, or more, or may be located much closer together (e.g., millimeters apart). At each sensor, a detected RF signal is used to modulate the optical mode (e.g., using an electro-optic modulator), thereby imposing on it a quadrature displacement (e.g., a phase shift or amplitude shift). A balanced homodyne detector can then be used to measure the quadrature displacement. The measured displacements can then be processed to obtain an estimate of a global property of the RF signal.

AoA measurements are one application that can benefit from the present embodiments. The AoA is one example of a global property of the RF signal. Here, the RF signal can be locally detected at each of the RF-photonic sensors. As described in more detail below, the quantum circuit used to generate the CV multipartite entangled state can be configured (e.g., using variable beamsplitters) to set the amplitudes, or weights, of the optical modes. For certain ratios of amplitudes, the measured displacements can be collectively processed to obtain an estimate of the global property with an uncertainty (e.g., variance or standard deviation) below the SQL. Presented below are experimental results demonstrating sub-SQL variance for an array of three RF-photonic sensors detecting the AoA of a RF signal.

The present embodiments enable improved AoA measurements as compared to classical measurements. These improved measurements may be used, for example, to construct radio direction finders with higher sensitivity and dynamic range. However, the use of CV multipartite-entangled states for distributed sensing can be used for other applications, such as spatially separated Michelson interferometers, Fabry-Perot interferometers, Mach-Zehnder interferometers, and other types of optical interferometers. Therefore, the present embodiments may be advantageously used to improve the sensitivity and/or dynamic range for a host of other applications, including radio astronomy, positioning, navigation, and time-keeping.

DETAILED DESCRIPTION OF THE EMBODIMENTS

Figure 1:
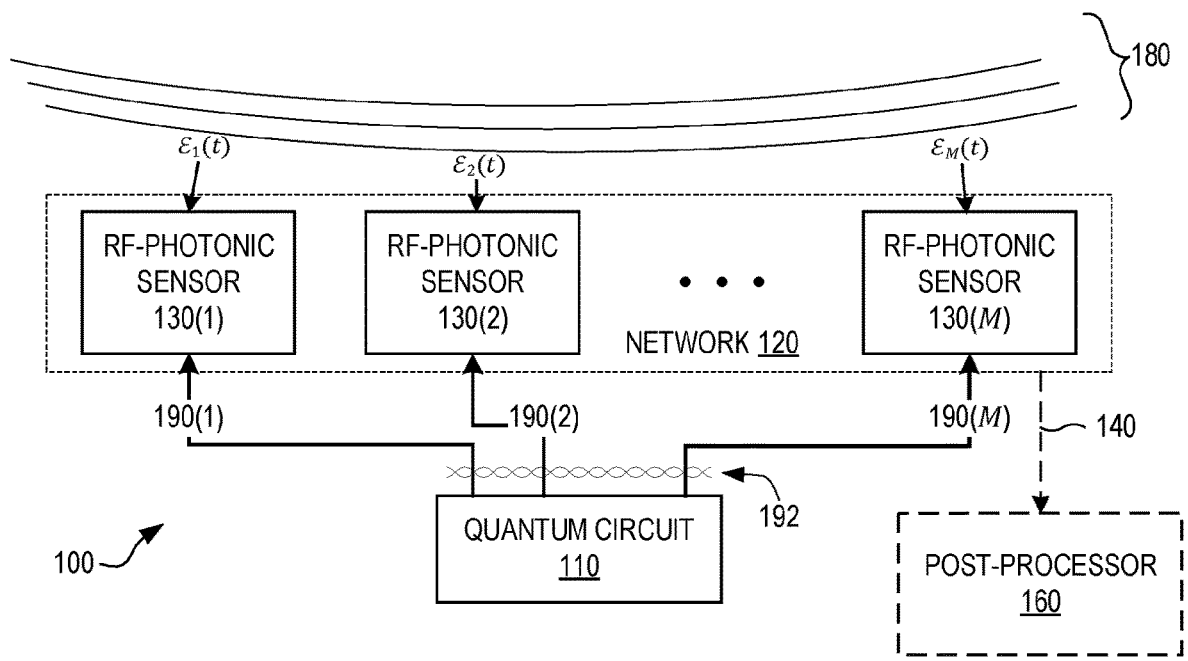
FIG. 1 shows an entangled RF-photonic sensor system probing a radiofrequency (RF) signal at several spatially distributed locations, in an embodiment.

FIG. 1 shows an entangled RF-photonic sensor system 100 probing a radiofrequency (RF) signal 180 at several spatially distributed locations. The sensor system 100 utilizes entanglement to extend the benefits of quantum sensing to distributed sensing at multiple spatially separated nodes. Specifically, the sensor system 100 enables measurement of a global property of the RF signal 180 with a sensitivity below the standard quantum limit (SQL). At the SQL, the sensitivity can improve, at best, as the square-root of integration time.

With the sensor system 100, on the other hand, the sensitivity improves faster than the square-root of integration time, advantageously reducing the integration time needed to achieve a target sensitivity. This increase in measurement speed can be particularly beneficially for real-time sensing applications, such as angle-of-arrival measurements of the RF signal 180.

The sensor system 100 includes a quantum circuit 110 and a spatially distributed network 120 of M RF-photonic sensors 130, where M is an integer greater than one. Each RF-photonic sensor 130 is also referred to herein as a "node" of the network 120. In the example of FIG. 1, the RF-photonic sensors 130 are equally spaced in a line, thereby forming a one-dimensional linear array. This geometry is particularly useful for measuring the angle-of-arrival of the RF signal 180. A spacing of the linear array (i.e., a nearest-neighbor distance between pairs of the RF-photonic sensors 130) may be as large as several kilometers, or more. However, the spacing may alternatively be smaller, such as a few centimeters, or less. For example, some or all of the RF-photonic sensors 130 may be implemented on a single photonic integrated chip (PIC). Without departing from the scope hereof, the RF-photonic sensors 130 may be alternatively arranged as a different type of array, such as a linear array with unequal spacings, a loop (e.g., circle, square), a two-dimensional array, or a three-dimensional array. For detecting an angle-of-arrival, the spacing may be less than one-half of the wavelength of the RF signal 180.

The quantum circuit 110 generates M optical modes 190 that cooperatively form a continuous-variable (CV) multipartite entangled state 192. Each optical mode 190($i$) is transmitted to a corresponding RF-photonic sensor 130($i$). Entangled photons are well preserved in a controlled environment and therefore can be distributed to the RF-photonic sensors 130 with minimal loss. However, since the optical modes 190 form a CV multipartite entangled state, as opposed to a discrete-variable multipartite entangled state, the sensor system 100 is robust against photon loss, thereby allowing the sensor system 100 to achieve sub-SQL sensitivity even in the presence of loss.

At each RF-photonic sensor 130($i$), the electric field of the RF signal 180 can be locally represented as $\varepsilon_i(t)=E_i \cos(\omega_c t + \varphi_i)$, wherein $\omega_c$ is the carrier frequency of the RF signal 180, $E_i$ is the local amplitude, and $\varphi_i$ is the local phase. At each RF-photonic sensor 130($i$), a local quadrature displacement $\alpha_i$ is imposed on the optical mode 190($i$) according to the corresponding local amplitude $E_i$ and/or local phase $\varphi_i$. The RF-photonic sensor 130($i$) then detects the optical mode 190($i$) to obtain a measured value $\tilde{\alpha}_i$ that estimates the local quadrature displacement $\alpha_i$. M measured values $\tilde{\alpha}_1, \ldots, \tilde{\alpha}_M$ estimate M corresponding local quadrature displacements $\alpha_1 \ldots \alpha_M$, and collectively provide a measure of a global property $\alpha$ of the RF signal 180. In one example, the global property is a global amplitude of the RF signal 180. In another example, the global property is an angle of arrival of the RF signal 180.

In one embodiment, sensor data 140 from the network 120 (e.g., the measured values $\tilde{\alpha}_1, \ldots, \tilde{\alpha}_M$) is processed in a classical (i.e., non-quantum) manner to determine an estimate $\tilde{\alpha}$ of the global property $\alpha$. For example, in FIG. 1 the sensor system 100 includes a classical post-processor 160 that is programmed (e.g., via machine-readable instructions that are stored in a memory and executed by a processor) to process sensor data from network 120 (i.e., the measured values $\tilde{\alpha}_1, \ldots, \tilde{\alpha}_M$) to determine the estimate $\tilde{\alpha}$. For some global properties (e.g., angle of arrival), $\alpha$ can be represented as a weighted combination of local quadrature displacements, i.e., $\alpha=\Sigma w_i \alpha_i$. In this case, the post-processor 160 determines the estimate $\tilde{\alpha}$ by calculating a weighted sum of the measured values, i.e., $\tilde{\alpha}=\Sigma w_i \tilde{\alpha}_i$. More generally, the global property $\alpha$ can be a different mathematical function of local quadrature displacements, in which case the post-processor 160 may be programmed to determine the estimate $\tilde{\alpha}$ from the data 140 accordingly. Details about determining the weights $w_i$ are presented below.

In another embodiment, a quantum processor (not shown in FIG. 1) processes the optical modes 190 after having the local quadrature displacements imposed thereon. The quantum processor may be another instance of the quantum circuit 110, or another type of quantum circuit. The modes outputted by the quantum processor may then be measured to obtain values that the classical post-processor 160 may subsequently process to determine the estimate $\tilde{\alpha}$ of the global property $\alpha$.

Figure 2:
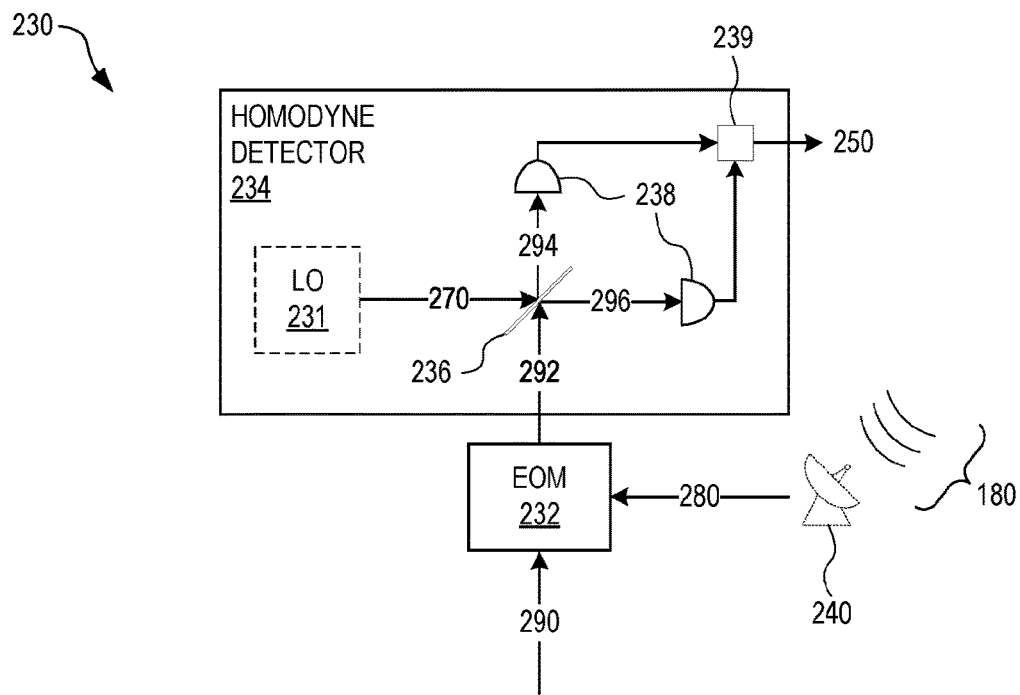
FIG. 2 shows an RF-photonic sensor for measuring a local quadrature displacement imposed on an optical mode by an RF signal, in an embodiment.

FIG. 2 shows a RF-photonic sensor 230 for measuring a local quadrature displacement imposed on an optical mode 290 by an RF signal 280. The RF-photonic sensor 230 is an embodiment of the RF-photonic sensor 130 that includes an electro-optic modulator (EOM) 232 and a balanced homodyne detector 234. The EOM 232 modulates the optical mode 290 according to the RF signal 280 to impose a local quadrature displacement (e.g., $\alpha_i$) onto the optical mode 290. For example, the EOM 232 may phase-modulate the optical mode 290, thereby imposing a phase-quadrature displacement onto the optical mode 290. Alternatively, the EOM 232 may amplitude-modulate the optical mode 290, thereby imposing an amplitude quadrature displacement onto the optical mode 290. In either case, the output of the EOM 232 is a displaced optical mode 292 that is quadrature-displaced, relative to the optical mode 290, by the quadrature displacement imposed thereon. The homodyne detector 234 can then be used to detect the displaced optical mode 292 to measure the quadrature displacement.

In the example of FIG. 2, the homodyne detector 234 includes a beamsplitter 236 that mixes the displaced optical mode 292 with a local oscillator (LO) field 270 to form two light fields 294 and 296. The homodyne detector 234 also includes two photodetectors 238 that detect the light fields 294 and 296, and detection circuitry 239 that combines signals outputted by the two photodetectors 238 into a homodyne output signal 250 that indicates the local quadrature displacement. The beamsplitter 236 may be a 50/50 beamsplitter. The RF-photonic sensor 230 may alternatively use another type of detector, instead of the homodyne detector 234, without departing from the scope hereof.

In an embodiment, the homodyne detector 234 further includes a LO source 231 that generates the LO field 270. The LO source 231 may be a laser. Although not shown in FIG. 2, a phase shifter may be used to adjust the phase of the LO field 270 so that the homodyne detector 234 measures the phase-quadrature component of the displaced optical mode 292. In this case, the homodyne output signal 250 indicates a phase-quadrature displacement. Alternatively, the phase of the LO field 270 may be adjusted so that the homodyne detector 234 measures the amplitude-quadrature component of the displaced optical mode 292. In this case, the homodyne output signal 250 indicates an amplitude-quadrature displacement.

In some embodiments, M instances of the RF-photonic sensor 230 are used for the M RF-photonic sensors 130. In these embodiments, only one LO source 231 can be used for all of the sensors 230. For example, the one output of a laser can be split and transmitted to each RF-photonic sensor 230 (e.g., see FIG. 11 below). Also in these embodiments, the sensor data 140 is obtained by combining the measured values $\tilde{\alpha}_1, \ldots, \tilde{\alpha}_M$ obtained from the output signals 250 of the RF-photonic sensors 230.

In some embodiments, the RF-photonic sensor 230 is coupled with an antenna 240 that locally receives the RF signal 180 as a wireless signal and electrically transmits the locally received signal to the EOM 232 as the RF signal 280. A waveguide (e.g., coaxial cable or microstrip waveguide) may be used to electrically transmit the RF signal 280 from the antenna 240 to the EOM 232. One or more electronic components (e.g., high-voltage EOM drivers, RF amplifiers, impedance transformers, baluns, filters, etc.) may be used to condition the RF signal 280 for driving the EOM 232.

The sensor system 100 may be integrated into a classical RF sensor system having a network of spatially distributed RF antennas 240, so as to equip the otherwise classical RF sensor system with sub-SQL sensing capability. In one example of such integration, each RF-photonic sensor 130 is coupled to an output of a respective RF antenna 240 (e.g., the EOM 232 of each RF-photonic sensor 230 is coupled to the output of a respective RF antenna 240).

Figure 3:
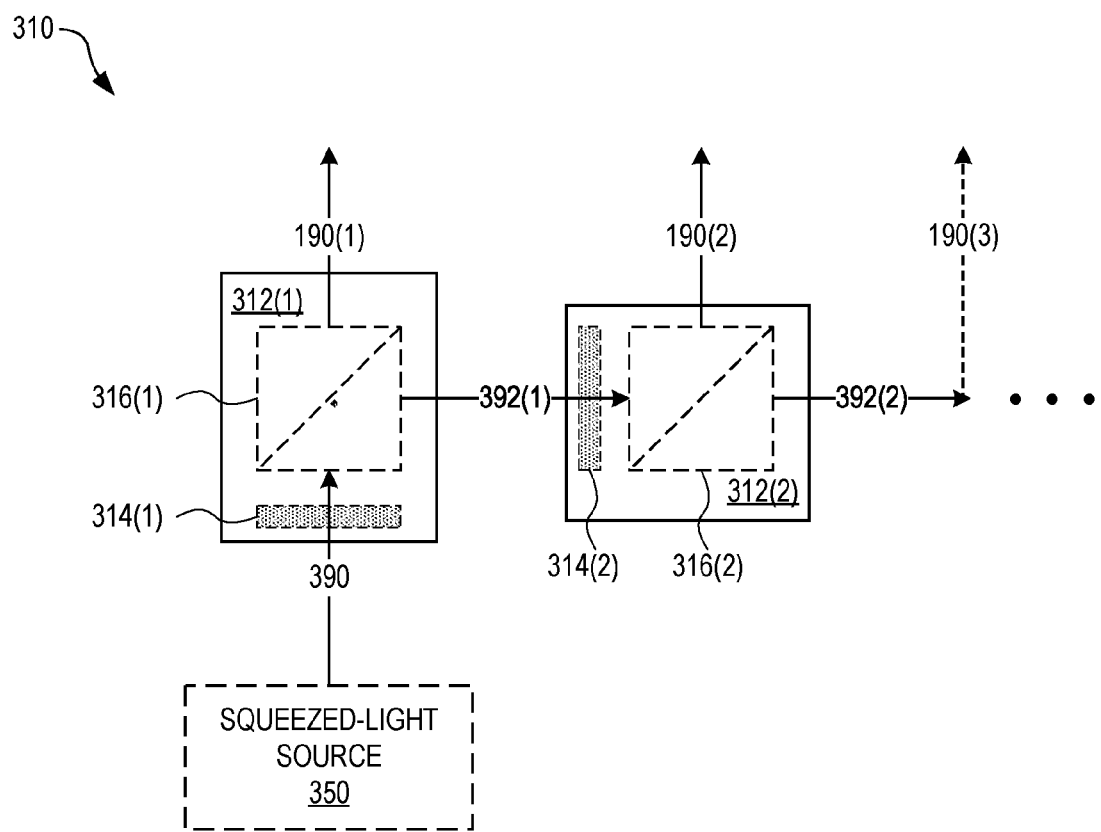
FIG. 3 shows a reconfigurable quantum circuit for generating the CV multipartite entangled state of FIG. 1, in an embodiment.

FIG. 3 shows a reconfigurable quantum circuit 310 for generating the CV multipartite entangled state 192. The quantum circuit 310 is an embodiment of the quantum circuit 110 of FIG. 1. The quantum circuit 310 includes a sequence of M−1 variable beamsplitters 312(i), of which only the first two are depicted in FIG. 3. Each variable beamsplitter 312(i) may include, for example, a half-waveplate 314(i) and a fixed polarized beamsplitter 316(i). The input to the quantum circuit 310 is a squeezed vacuum state 390. A first half-waveplate 314(1) rotates the polarization of the squeezed vacuum state 390 to split the squeezed vacuum state 390 into the first optical mode 190(1) and a first intermediate mode 392(1). Adjusting the first half-waveplate 314(1) (e.g., by rotating it about the optical axis) sets the splitting ratio between the first optical mode 190(1) and the first intermediate mode 392(1). Similarly, a second half-waveplate 314(2) rotates the polarization of the first intermediate mode 392(1) to split the first intermediate mode 392(1) into the second optical mode 190(2) and a second intermediate mode 392(2). The modes 190(1), 190(2), and 392(2) are entangled. This sequence continues, which each variable beamsplitter 312(i) generating one corresponding optical mode 190(i), and a last variable beamsplitter 312(M−1) generating the optical modes 190(M−1) and 190(M). For example, when M=3 (see FIG. 11 below), the second intermediate mode 392(2) may be used as the third optical mode 190(3).

When M≥4, at least some of the variable beamsplitters 312 may be arranged in a cascading network, as opposed to the linear sequence shown in FIG. 3. In a cascading network, an input light field is first split into two light fields, and each of these two light fields are then split into two other light fields, etc. Other techniques, components, and geometries for splitting a single squeezed-light beam into several coherent optical fields may be used to generate the CV multipartite entangled state 192 without departing from the scope hereof. For example, each variable beamsplitter 312(i) may use an optical waveguide and directional coupler to split a light field into two.

The variable beamsplitters 312 cooperate with the fixed beamsplitters 316 to define the splitting ratios between the optical modes 190, i.e., the relative amplitudes of the optical modes 190. These amplitudes are the weights $w_1, \ldots, w_M$ described above for determining the estimate $\tilde{\alpha}$. Regardless of its hardware implementation, the quantum circuit 310 is reconfigurable such that the weights w may be optimized according to the sensing task to be performed. For example, the weights w may be selected to minimize the variance for an angle-of-arrival measurement, as described in more detail below.

In some embodiments, the quantum circuit 310 includes a squeezed-light source 350 that generates the squeezed vacuum state 390. The squeezed-light source 350 may be, for example, an optical parametric amplifier operating in a parametric amplification regime. Alternatively the squeezed-light source 350 may be an optical parametric amplifier. The squeezed vacuum state 390 may be phase-squeezed. The wavelength of the squeezed vacuum state 390, and therefore the CV multipartite entangled state 192, may lie anywhere in the infrared, optical, or ultraviolet regions of the electromagnetic spectrum. To minimize loss, it is common to select the wavelength to be in the near infrared (e.g., 700-1600 nm), where low-cost, low-loss optical components and fiber are readily available. Transmission of the optical modes 190 to the sensors 130 may utilize optical fiber when the distances between sensors 130 is large (e.g., several kilometers, or more) and when physical structures prevent direct line-of-sight free-space transmission.

In an embodiment of the sensor system 100 that uses M of the RF-photonic sensors 230 of FIG. 2, the network 120 may include an additional quantum circuit that collectively processes the M displaced optical modes 292(i). This additional quantum circuit may be similar to the quantum circuit 110. In one implementation of this embodiment, the sensor system 100 includes two quantum circuits 310, one that processes the M optical modes 190(i) and another that processes the M displaced optical modes 292(i). These two quantum circuits 310 may be configured with the same or different beamsplitter ratios and phase shifts.

Figure 4:
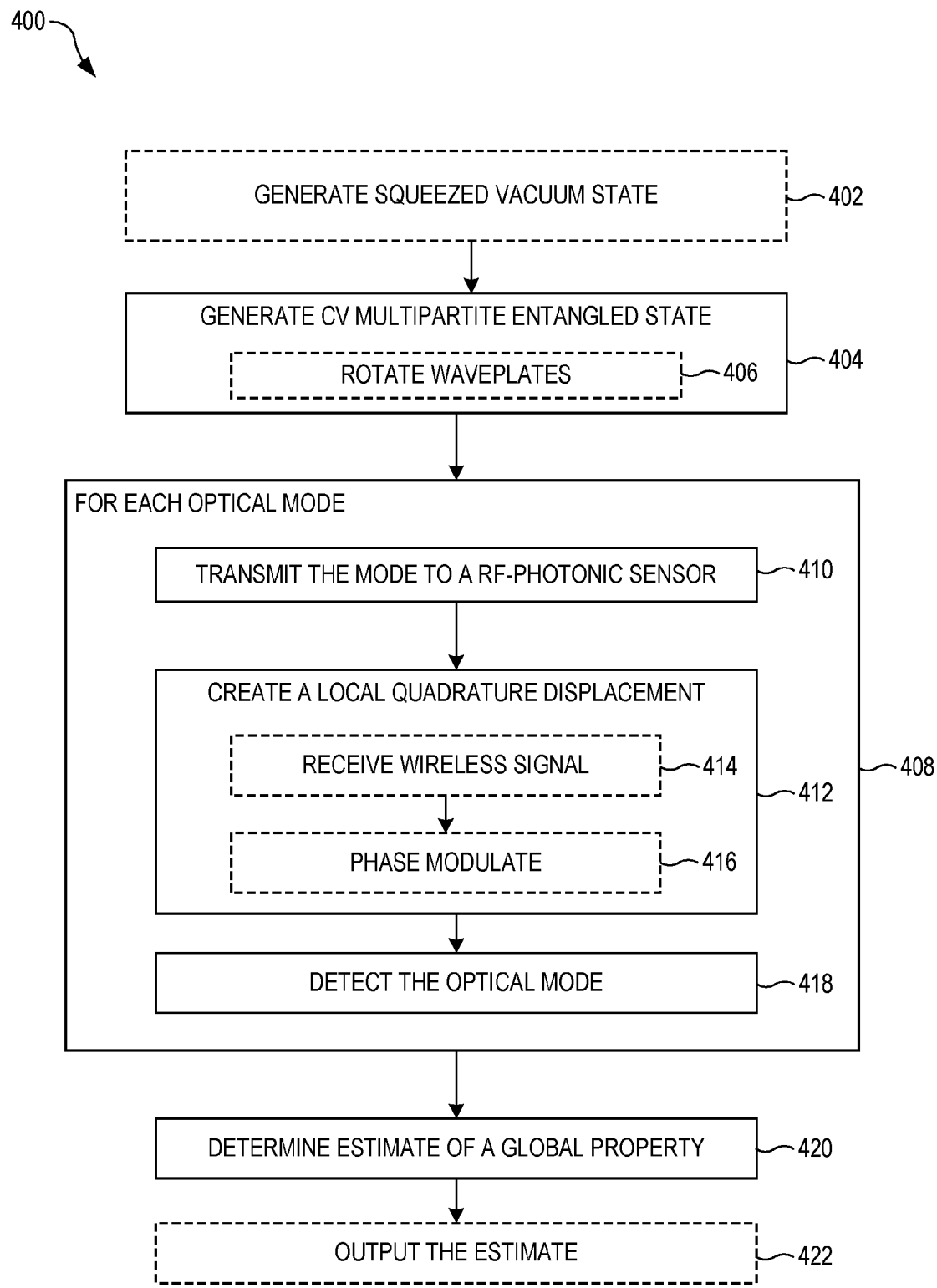
FIG. 4 is a flow chart of a method for entangled radiofrequency-photonic sensing, in embodiments.

FIG. 4 is a flow chart of a method 400 for entangled radiofrequency-photonic sensing. The method 400 may be performed by the entangled RF-photonic sensor system 100 of FIG. 1. In the block 404, a plurality of optical modes, cooperatively forming a CV multipartite entangled state, is generated. In one example of the block 404, the quantum circuit 110 generates the CV multipartite entangled state 192. In some embodiments, the block 404 includes a block 406, in which a plurality of variable beamsplitters are adjusted to generate the CV multipartite entangled state from a single squeezed vacuum state. In one example of the block 406, the waveplates 314 of the quantum circuit 300 are rotated to generate the plurality of optical modes 190 from a squeezed vacuum state 390.

The method 400 includes a block 408 that iterates over each of the M optical modes forming the CV multipartite entangled state. In the block 410, the $i^{th}$ optical mode is transmitted to a corresponding $i^{th}$ RF-photonic sensor. In one example of the block 410, each optical mode 190($i$) is transmitted to a corresponding RF-photonic sensor 130($i$), as shown in FIG. 1. In the block 412, a local quadrature displacement is created on the $i^{th}$ optical mode using a radiofrequency signal at the $i^{th}$ RF-photonic sensor. In one example of the block 412, the RF-photonic sensor 130($i$) induces a local quadrature displacement $\alpha_i$ onto the corresponding optical mode 190($i$) according to the local amplitude $E_i$ and/or local phase $\varphi_i$ of the RF signal 180. In the block 414, the $i^{th}$ optical mode is detected to measure its local quadrature displacement. In one example of the block 414, the optical mode 190($i$) is detected, after being quadrature displaced, using the homodyne detector 234 of FIG. 2 to obtain a corresponding measured value $\tilde{\alpha}_i$ of the local quadrature displacement $\alpha_i$.

In some embodiments of the method 400, the block 412 contains sub-blocks 416 and 418. In the sub-block 416, the radiofrequency signal is wirelessly received at the $i^{th}$ RF-photonic sensor. In the sub-block 418, the received radiofrequency signal is electrically transmitted to an electro-optic modulator of the $i^{th}$ RF-photonic sensor. In these embodiments, the electro-optic modulator phase modulates the $i^{th}$ optical mode according to the wirelessly received radiofrequency signal. In one example of these embodiments, the RF signal 180 is locally received with an antenna 240 and electrically transmitted to the EOM 232 as the RF signal 280, as shown in FIG. 2.

The method 400 also includes the block 420, in which an estimate of a global property of the radiofrequency signal with an uncertainty below the standard quantum limit. The estimate is based on the measured values of the local quadrature displacements. In one example of the block 420, the post-processor 160 receives the measured values $\tilde{\alpha}_1, \ldots, \tilde{\alpha}_M$ as sensor data 140 from the network 120, and processes the measured values $\tilde{\alpha}_1, \ldots, \tilde{\alpha}_M$ to determine the estimate $\tilde{\alpha}$ of the global property $\alpha$. The estimate may be calculated as a weighted sum of the measured values of the local quadrature displacements.

In some embodiments, the method 400 includes the block 422, in which the estimate is outputted. For example, the estimate may be displayed to a user on a computer screen, or transmitted over a computer network to another computing device for subsequent processing or instrument control. Alternatively, the estimate may be outputted to a hard drive or memory card for storage. The variance of the estimate may also be outputted.

In some embodiments, the method 400 includes the block 402, in which the squeezed vacuum state is generated. In one example of the block 402, the squeezed-light source 350 (e.g., an optical parametric amplifier) generates the squeezed vacuum state 390.

Figure 5:
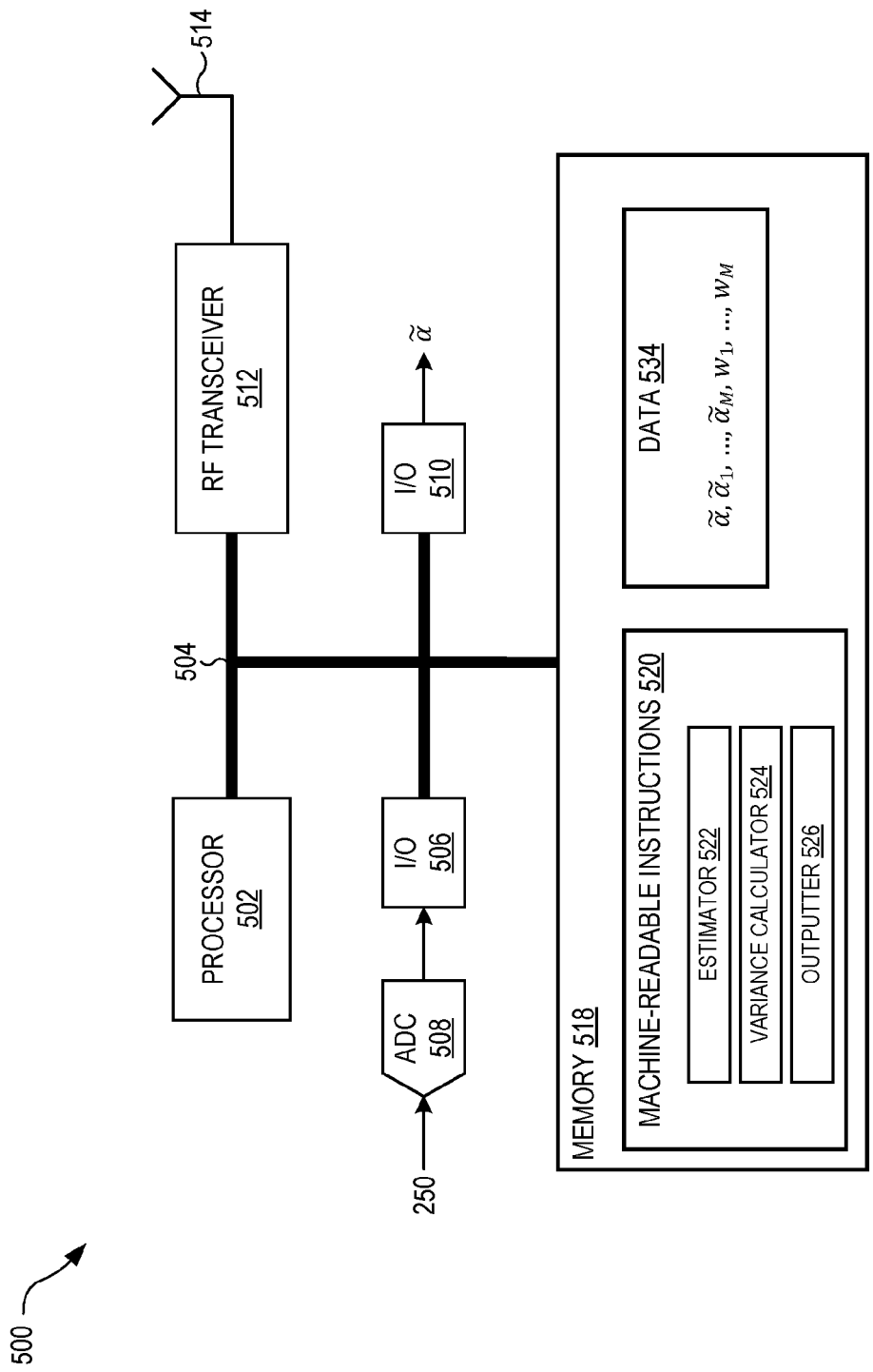
FIG. 5 is a functional diagram of a classical computing system that processes measured values of local quadrature displacements, in an embodiment.

FIG. 5 is a functional diagram of a classical computing system 500 that processes measured values of local quadrature displacements to obtain an estimate for the global property. The computing system 500 is one example of the post-processor 160 of FIG. 1. The computing system 500 has a processor 502 and a memory 518 that communicate with each other over a system bus 504. The memory 518 stores machine-readable instructions 520 that, when executed by the processor 502, control the computing system 500 to implement the functionality and methods described herein. The memory 518 also stores data 534 used by the processor 502 when executing the machine-readable instructions 520. In the example of FIG. 5, the data 534 stores the estimate $\tilde{\alpha}$ of the global property, the measured values $\tilde{\alpha}_1, \ldots, \tilde{\alpha}_M$ of the local quadrature displacements, and the weights $w_1, \ldots, w_M$. The machine-readable instructions 520 include an estimator 522 that calculates $\tilde{\alpha}$ from the measured values $\tilde{\alpha}_1, \ldots, \tilde{\alpha}_M$ and weights $w_1, \ldots, w_M$, a variance calculator 524 that computes a variance (or another type of uncertainty) for the estimate $\tilde{\alpha}$, and an outputter 526 that transmits the estimate $\tilde{\alpha}$ to another device. The memory 518 may store additional data 534 and machine-readable instructions 520 than shown in FIG. 5 without departing from the scope hereof.

The processor 502 may be any type of circuit or integrated circuit capable of performing logic, control, and input/output operations. For example, the processor 502 may include one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC). The processor 502 may include a memory controller, bus controller, and other components that manage data flow between the processor 502, the memory 518, and other components communicably coupled to the system bus 504.

The computing system 500 may include various inputs and outputs to communicate with other devices, such as the RF-photonic sensors 130. For example, in FIG. 5 the computing system 500 has an analog-to-digital converter (ADC) 508 that digitizes each homodyne output signal 250 when the homodyne output signal 250 is an analog signal. In this example, the computing system 500 includes an I/O block 506 that receives the digital output from the ADC 508, and transmits the digital values to the memory 518 for storage. In another example, each homodyne detector 234 transmits the output signal 250 to the computing system 500 as a digital signal (e.g., via Ethernet, USB, fiber-optic, etc.). In this case, the I/O block 506 may be a network card or USB interface. The computing system 500 may also include a wireless transceiver 512 that works with an antenna 514 to wirelessly transmit and receive data (e.g., via Bluetooth, Wi-Fi, cellular, etc.). Wireless communication may be advantageous when the RF-photonic sensors 130 are spatially separated by distances that are large enough (hundreds of meters, or more) to prohibit communication via copper.

The computing system 500 may also include an I/O block 510 for outputting the resulting estimate $\tilde{\alpha}$. Alternatively, the computing system 500 may wirelessly transmit the estimate $\tilde{\alpha}$ to another computing device for storage, display to a user, or another purpose.

Experimental Demonstration

Recent theoretical advances in distributed quantum sensing (DQS) promise a boosted performance for distributed sensing problems. Compared with DQS based on discrete-variable (DV) multipartite entanglement, DQS based on continuous-variable (CV) multipartite entanglement (also referred to herein as CV-DQS) enjoys deterministic preparation of multipartite entangled probe states and robustness against loss.

Figure 6A:
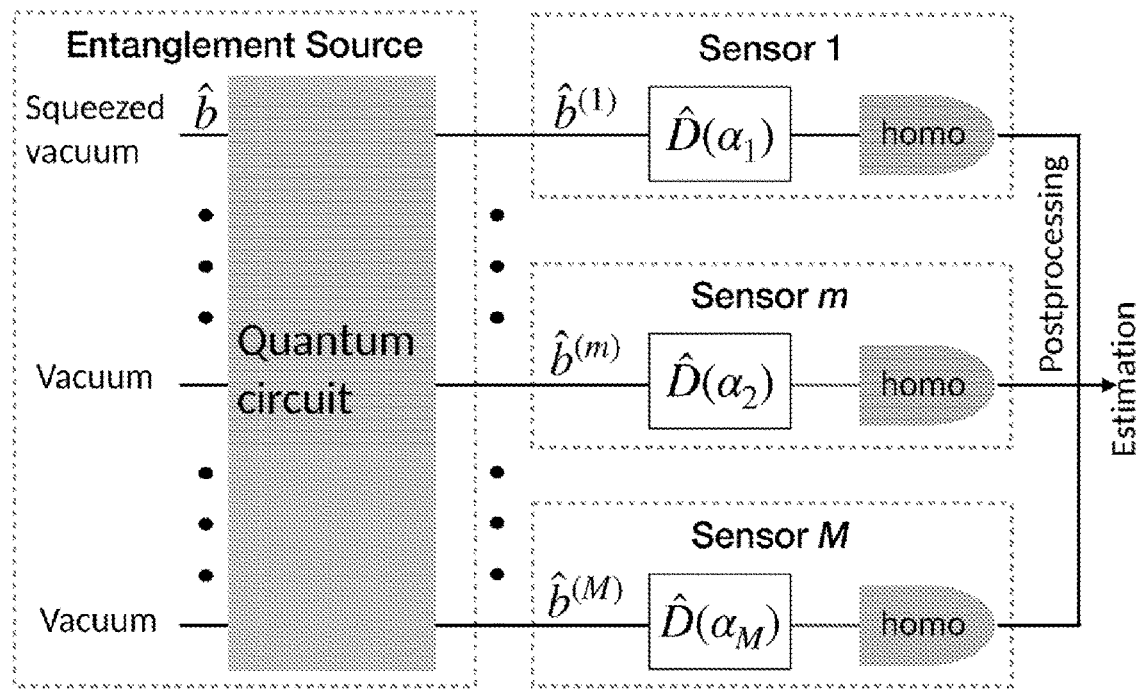
FIG. 6A illustrates a protocol for continuous-variable distributed quantum sensing, in embodiments.

FIG. 6A illustrates a protocol for CV-DQS. Here, a squeezed vacuum state with a mean photon number $N_s$ is processed by a quantum circuit consisting of beam splitters (BSs) and phase shifters to create a CV multipartite entangled state in M modes, $\{\hat{b}^{(m)}, 1 \leq m \leq M\}$, shared by M sensors. The sensing attempt is modeled by a quadrature displacement operation $\hat{D}(\alpha_m)$ on each mode. The distributed sensing problem is to estimate a global property across all sensors. Let the probed global parameter be $$\bar{\alpha} = \sum_{m=1}^{M} v_m \alpha_m,$$

where the weights $\{v_m, 1 \leq m \leq M\}$ define the global parameter estimation problem. To estimate the displacements, homodyne measurements yield outcomes $\tilde{\alpha}_m$s, followed by classical postprocessing that obtains an estimation $\tilde{\alpha} = \Sigma_m v_m \tilde{\alpha}_m$.

Critically, the quantum circuit in FIG. 6A must be optimized to generate a CV multipartite entangled state that minimizes the estimated variance in a given distributed sensing problem. Since $\tilde{\alpha}$ is obtained as if an effective mode $\Sigma v_m \hat{b}^{(m)}$ is homodyned, the minimum estimation variance is attained when the effective mode equals the original squeezed vacuum mode $\hat{b}$. As such, the optimum quantum circuit distributes $v_m$ amplitude portion of the squeezed vacuum state to the $m^{th}$ sensor, leading to the minimum estimation variance:

$$\delta\alpha^2 = \frac{\bar{v}^2}{4}\left[\frac{\eta}{(\sqrt{N_2+1}+\sqrt{N_s})^2} + 1 - \eta\right], \quad (1)$$

where $$\bar{v} \equiv \sqrt{\sum_{m=1}^{M} v_m^2}$$

and $1-\eta$ is the loss at each sensor.

An upper bound for the Fisher information can be derived by explicitly reducing it to quadrature variances. The CV-DQS protocol of FIG. 6A saturates the upper bound in the absence of loss (i.e., $\eta=1$) and is therefore the optimum among all protocols subject to a photon-number constraint for the probe. Specifically, at $\eta=1$ and a fixed mean photon number $n_s \equiv N_s/M$ at each sensor, equal weights yield $\delta\alpha^2 \propto (1/M)^2 \times 1/n_s$, i.e., a Heisenberg scaling for the estimation variance with respect to the number of sensors, whereas any protocol without entanglement is subject to the SQL. Also, $M=1$ and $\bar{v}=1$ reduce the situation to single parameter estimation enhanced by a single-mode squeezed vacuum state. In the presence of loss, the Fisher-information upper bound becomes loose. However, by reducing the multiparameter estimation problem to a single-parameter estimation problem through a fictitious set of conjugating beamsplitters, it can be shown that the CV-DQS protocol remains the optimum among all protocols based on Gaussian states or homodyne measurements. Importantly, the entanglement-enabled advantage in the CV-DQS protocol survives arbitrary amount of loss, even though loss precludes a Heisenberg scaling.

Experimentally, it has been shown that CV entanglement offers a measurement-sensitivity advantage in optical phase estimation over using separable states, but the connection between the entanglement structure and the enabled quantum advantage in different distributed sensing problems have not been experimentally explored. Moreover, the CV-DQS protocol of FIG. 6A represents a general framework for tackling sensing problems in different physical domains, because quantum transducers can convert the probed physical parameter to quadrature displacement. Here, a reconfigurable entangled sensor network equipped with electro-optic transducers (EOTs) is demonstrated for entanglement-enhanced measurements of RF signals. The experiment unveils how the CV multipartite entanglement structure determines the quantum advantage in different distributed sensing problems. Specifically, by tailoring the entanglement shared by the sensors, the entangled RF-photonic sensor network achieves an estimation variance 3.2 dB below the SQL in measuring the average RF field amplitudes. Also, in measuring the angle of arrival (AoA) of an emulated incident RF wave, the entangled RF-photonic sensor network achieves an estimation variance 3.2 dB below the SQL via phase difference estimation at an edge node and 3.5 dB below the SQL via phase-difference estimation at a central node.

Figure 6B:
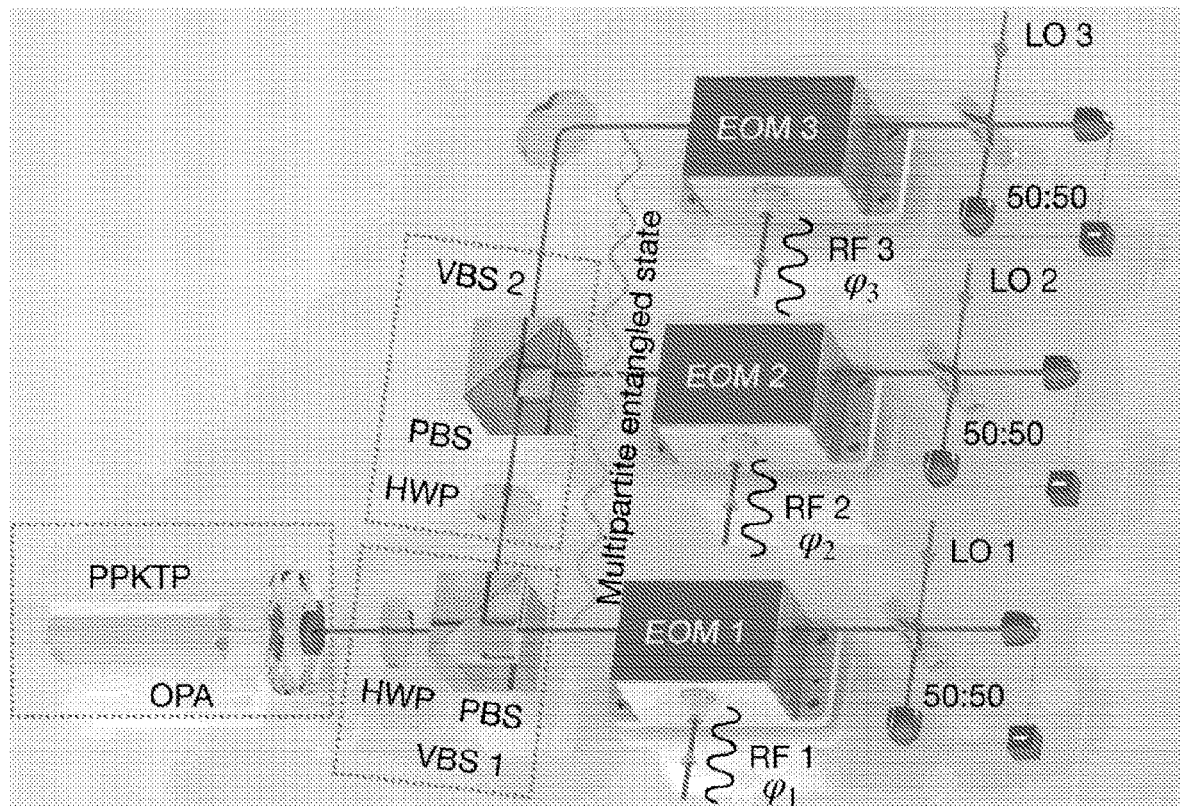
FIG. 6B illustrates an experiment for continuous-variable distributed quantum sensing, in an embodiment.

FIG. 6B illustrates an experiment for CV-DQS. A sideband phase-squeezed state is generated from a PPKTP crystal embedded in an optical parametric amplifier (OPA) cavity. The phase-squeezed state is subsequently processed by a quantum circuit to produce a CV multipartite entangled state shared by three RF-photonic sensors. The quantum circuit uses two variable beamsplitters (labeled VBS 1 and VBS 2 in FIG. 6B) to configure the CV multipartite entangled state for different sensing tasks. Each VBS consists of a half-wave plate (HWP) and a polarizing beamsplitter (PBS). The RF field at the $m^{th}$ sensor is represented by $\varepsilon_m(t) = E_m \cos(\omega_c t + \varphi_m)$, where $\omega_c$ is the carrier frequency, $E_m$ is the amplitude, and $\varphi_m$ is the phase of the RF field. At each sensor, the electro-optic modulator (EOM) is driven by the probed RF field to induce a displacement on the squeezed phase quadrature, as described by $$\alpha_m = i\sqrt{2}\,\pi g_m a_c^{(m)} \frac{\gamma E_m}{2V_\pi}\varphi_m, \quad (2)$$

where $g_m = \pm 1$ is set by an RF signal delay that controls the sign of the displacement, $a_c^{(m)}$ is the amplitude of the baseband coherent state at the $m^{th}$ sensor, $V_\pi$ is the half-wave voltage of the EOM, and $\gamma$ models the conversion from an external electric field to the internal voltage. To estimate the displacement, a local oscillator (LO) interferes the signal on a 50:50 BS for a balanced homodyne measurement. The time-domain data from the three homodyne measurements are post-processed to derive the estimated parameter and the associated estimation variance under different settings.

Prior to constructing an entangled sensor network, RF-photonic sensing, as enhanced by single-mode squeezed light, was assessed. To do so, VBS 1 was configured to deliver all light to Sensor 1. FIG. 7A is a plot of three homodyne traces that illustrate shot-noise suppression below the SQL. In the center trace of FIG. 7A, a calibrated shot-noise level with standard deviation normalized to 1 represents the SQL. The bottom and top traces are at $\varphi_1=0.54\pi$ and $1.32\pi$, respectively, and are normalized using the same factor as that for the center trace. The variances of the traces reflect the quantum measurement noise, which in turn determines the estimation variance. Beating the SQL is a nonclassical characteristic, as seen in the variances of the top and bottom traces. Both cases suppress the SQL by ~4 dB.

Figure 7B:
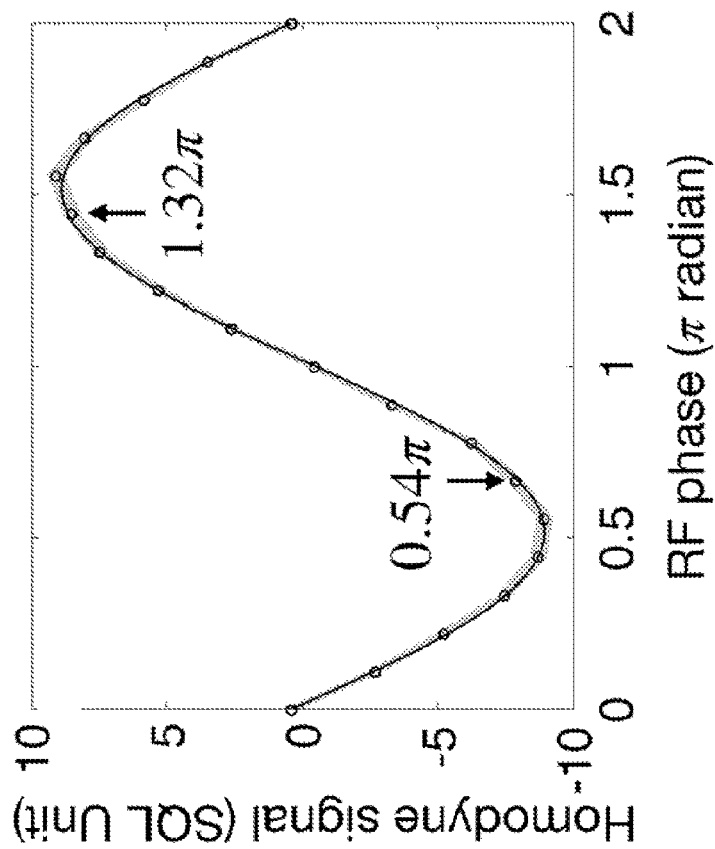
FIG. 7B is a plot illustrating how the mean of a time-domain homodyne trace varies as the phase of the RF field is swept.
Figure 7A:
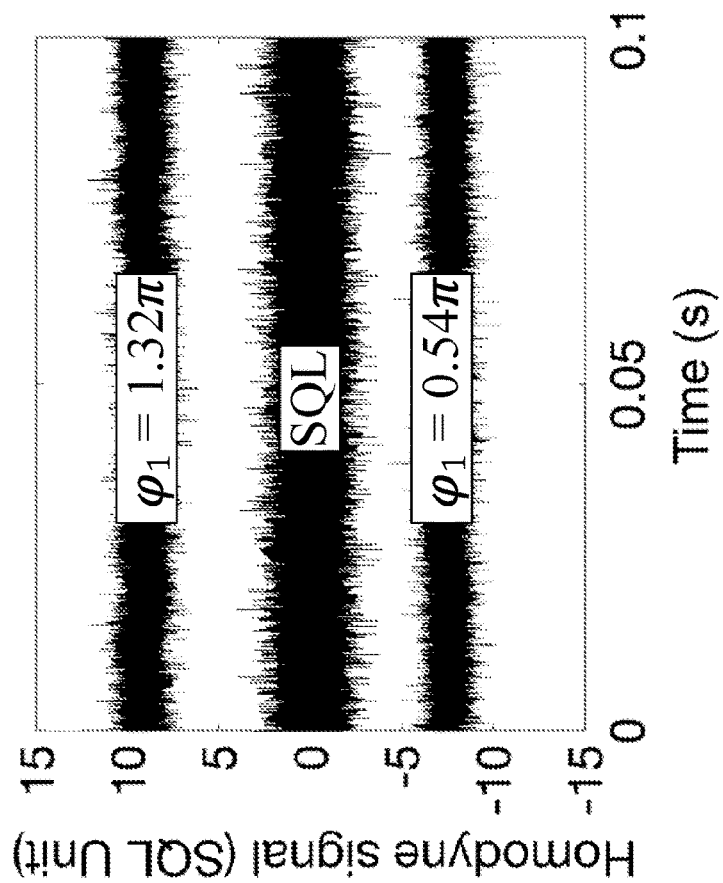
FIG. 7A is a plot of three homodyne traces that illustrate shot-noise suppression below the SQL.

FIG. 7B is a plot illustrating how the mean of a time-domain homodyne trace varies as the phase of the RF field is swept. The means are scaled to the SQL unit and plotted as circles in FIG. 7B, showing a nice fit to a sinusoidal function, as expected. The shaded area in FIG. 7B is the normalized standard deviation of the measurement noise.

The utility of CV multipartite entanglement in now demonstrated for three distributed RF sensing tasks. First, the average RF-field amplitude at the three sensors is estimated using an equally weighted CV multipartite entangled state, which yields the optimum performance. The RF-field amplitude at Sensor 1 is swept from 20 mV to 160 mV while the amplitudes of Sensors 2 and 3 are kept at 80 mV. The homodyne data from the three sensors are first averaged and then scaled to ensure an unbiased estimator. The estimates are plotted as circles in FIG. 8A, with the darker shaded area representing the estimation uncertainty due to quantum measurement noise. The deviation from the linear fit is caused by instability in phase locking. As a comparison, the estimated average RF-field amplitudes by a classical separable sensor network are plotted as triangles in the same figure, with the lighter shaded area representing the estimation uncertainty. The entangled sensor network shows a reduced estimation variance of 3.2 dB.

Figure 8B:
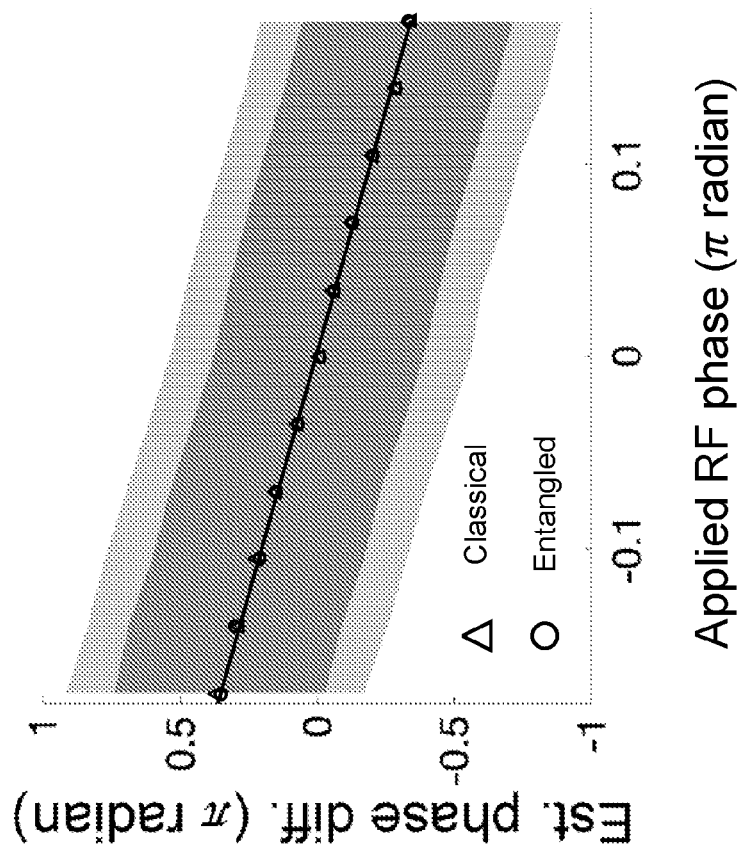
FIGS. 8A and 8B show estimates for average field amplitude and phase difference, respectively, at an edge node.
Figure 8A:
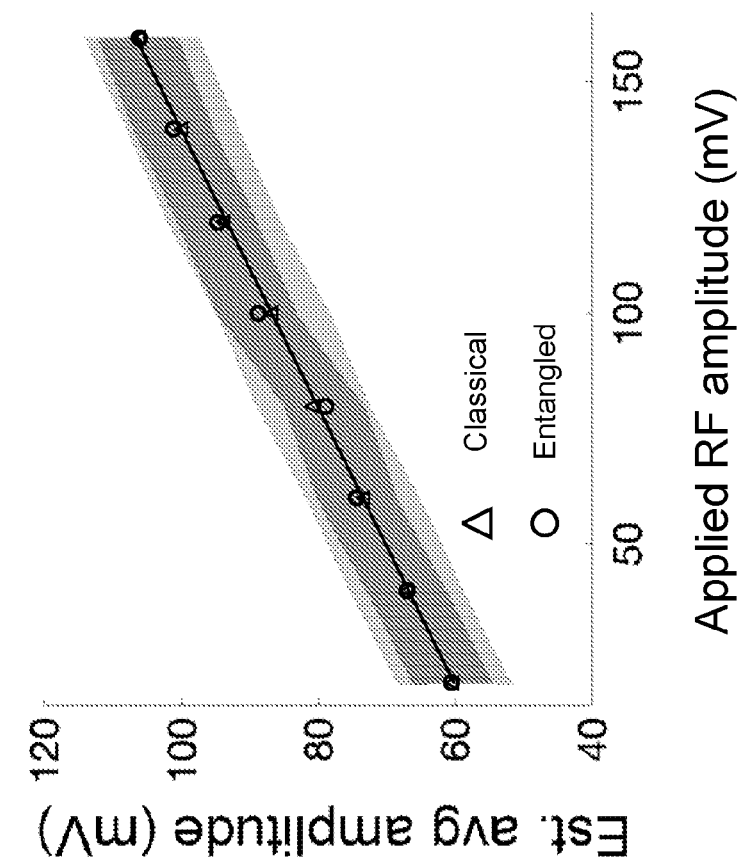

FIGS. 8A and 8B show estimates for average field amplitude and phase difference, respectively, at an edge node. The circles represent data for entangled sensors, and the triangles represent data for classical separable sensors. The dark and light shaded areas represent estimated uncertainties for the entangled and classical separable sensor networks, respectively. The entangled sensors show a clear reduced estimation uncertainty.

The AoA of an emulated incident RF field is then emulated. In a one-dimensional sensor array, this sensing problem is translated into the estimation of the phase difference across the sensors, which can be solved by a finite difference method. To estimate the phase difference at an edge node (served by Sensor 2 in the experiment), the optimum weights for the CV multipartite entangled state are [−3/2, 2, −1/2], generated by setting the splitting ratios (reflectivity:transmissivity) of the VBSs to 50:50 and 75:25. The negative signs in the weights are introduced by adding $\pi$-phase delays at Sensor 2 and Sensor 3. In this measurement, the RF phase at Sensor 1 and 3 is swept from −0.17 rad to 0.17 rad while the RF phase at Sensor 2 is set to 0. The estimated phase difference vs. the applied RF-field phase are plotted in FIG. 8B for the entangled scheme (circles) and compared to that of the classical separable scheme (triangles) networks with the shaded area representing the estimation uncertainties, showing a 3.2-dB reduction in the estimation variance for the entangled case.

A unique aspect of an entangled sensor network is that a proper multipartite entangled state need be prepared to achieve the optimum performance in a specific distributed sensing task. To show this, the splitting ratio for VBS 2 is varied to prepare different entangled states for the task of RF-field phase-difference estimation at an edge node (see inset of FIG. 9). The resulting estimation variances are compared with these for the classical separable sensor network under the same VBS settings. In the measurements, a positive transmissivity means the sign of homodyne data remains unchanged in postprocessing while a $\pi$-phase delay is introduced to the RF signal. This is equivalent to applying a $\pi$-phase shift on the quantum state at Sensor 3, followed by a sign flip on its homodyne data. A negative transmissivity indicates a sign flip is applied to Sensor 3's homodyne data in postprocessing and no $\pi$-phase delay on the RF signal. An unbiased estimator is ensured in either case.

Figure 9:
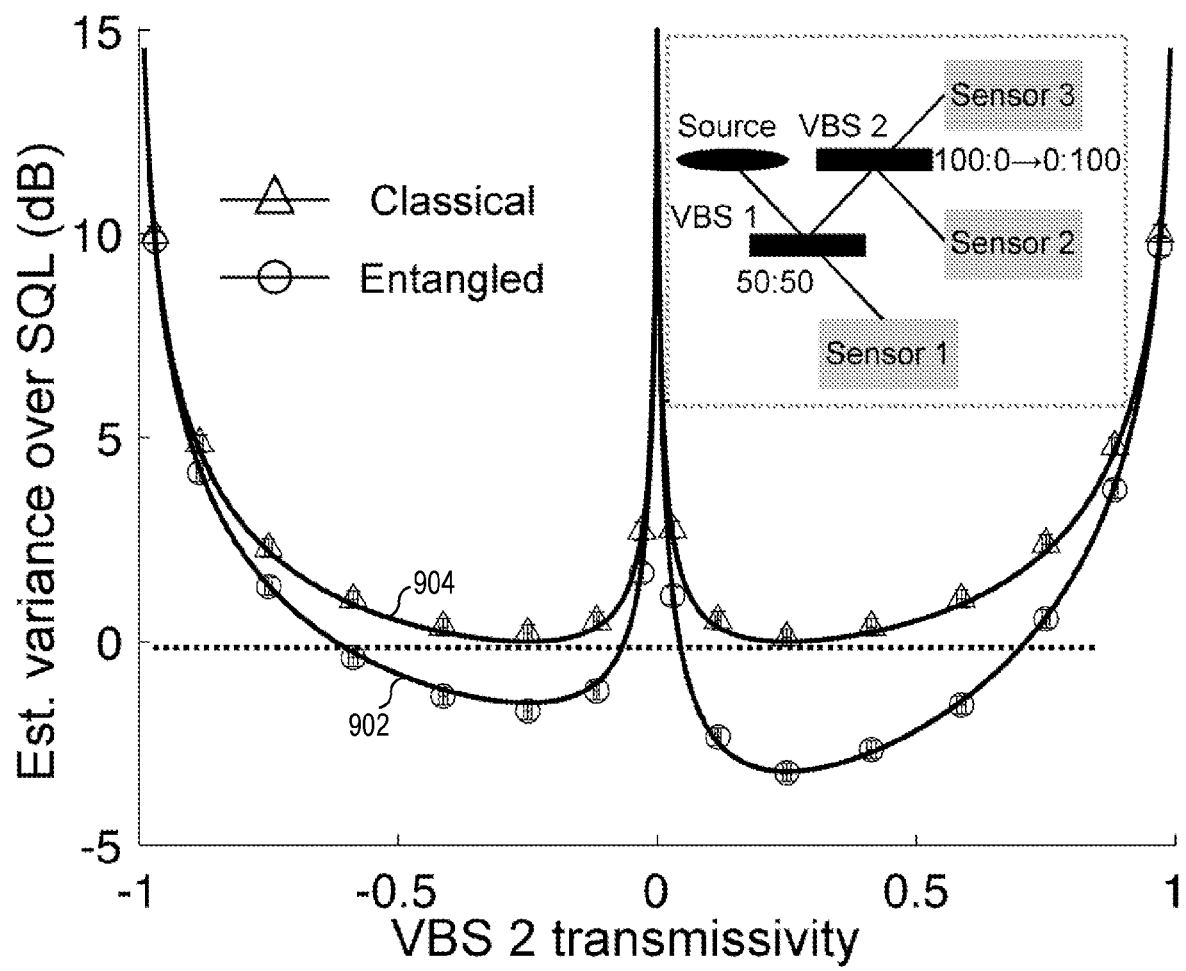
FIG. 9 illustrates optimization of a CV multipartite entangled state for phase difference at an edge node, in an embodiment.

FIG. 9 illustrates optimization of a CV multipartite entangled state for phase difference at an edge node. The circles represent data for entangled sensors, and the triangles represent data for classical separable sensors. The curve 902 represents the prediction for quantum theory, and the curve 904 represents the prediction for classical theory. The horizontal dotted line represents the SQL. Error bars account for estimated uncertainties arising from experimental instabilities. The symmetric classical curves vs. the asymmetric quantum curves manifest the correlated quantum noise arising from the homodyne detectors at different sensors. The inset of FIG. 9 illustrates the tuning ranges of the splitting ratios for the VBSs.

The estimation variance vs. transmissivity curves show very different behaviors for the entangled and classical separable cases. The curves for the classical separable case are symmetric, with the minimum estimation variances found at both positive and negative transmissivities, whereas the curves for the entangled case display a strong asymmetric characteristic. Such a behavior manifests the quantum correlation shared by the sensors. In a classical separable sensor network, the quantum measurement noise is independent at different sensors, so post-processing of the measurement data to acquire an unbiased estimator does not alter the noise power. In an entangled sensor network, however, the quantum measurement noise at different sensors is correlated, so it can only be reduced if the homodyne data from different sensors are summed with proper weights. Importantly, these weights are also needed to ensure an unbiased estimator. As such, tailoring a proper CV multipartite entangled state for a specific distributed sensing problem to simultaneously satisfy the two criteria is critical to achieve a large quantum advantage over a classical separable sensor network.

A few remarks are worth making. First, the experiment opens a window for quantum-enhanced RF-photonic sensing, which outperforms electronics-based sensing in its large processing bandwidths, engineered RF responses using optical filters, and capability of transporting RF signals over long distances via optical fibers. A recent photonics-based coherent radar system demonstrated key performance metrics such as a signal-to-noise ratio of 73 dB MHz$^{-1}$ and a spurious-free dynamic range of 70 dBc, comparable with state-of-the-art electronics-based radar systems' 80 dB MHz$^{-1}$ and 70 dBc. Higher RF-to-photonic conversion efficiency, determined by the $V_\pi$ of the EOM, can further increase the measurement sensitivity. State-of-the-art EOMs based on, e.g., piezo-optomechanical coupling, ultrasmall cavities, organic EO-plasmonic nanostructures, and highly nonlinear ferroelectric materials, can achieve $V_\pi<0.1$ V and thus increase the measurement sensitivity by >60 dB. It is worth noting that the quantum advantage survives low RF-photonic conversion efficiency, assuming the same EOMs are employed in both the entangled and classical separable sensor networks. Second, in the present experiment, the anti-squeezing level at the source is ~10 dB and the squeezing level is ~4 dB, from which it can be inferred that the ideal source squeezing is ~11.7 dB ($N_S$~3.3). The measured squeezing was ~3.2 dB for the senor network. Thus, an overall efficiency η~0.56 is derived. With equal weights, the optimum separable scheme employs ~7.9 dB of local squeezing at each sensor to match the total mean photon number and achieves a 2.7 dB of noise reduction. This leads to a ~10% advantage in estimation variance for the experimental result over that of the optimum separable sensor network, thereby verifying the entanglement shared by the sensors. Third, while the current entangled RF-photonic sensor network cannot beat the ultimate estimation precision limit set by the RF sky temperature, it does offer an advantage over a classical RF-photonic sensor network under the same task, assuming sensors are connected by low-loss optical fibers that distribute entanglement over a few kilometers without significant loss penalty. To further enlarge the operational range, noiseless linear amplifiers or CV error correction can be used to overcome loss. Fourth, the entangled sensor network does not require quantum memories, but with the assistance of quantum memories it will be able to extract time-domain information more effectively.

Theoretical Framework

Single RF-Photonic Sensor Enhanced by Sensor Light

Consider an entangled RF-photonic sensor network composed of M sensors. The quantum states of interest at each sensor are carried on three optical spectral modes, i.e., a central mode $\hat{a}_c^{(m)}$ at the optical carrier frequency $\Omega$ and two sideband modes $\hat{a}_\pm^{(m)}$ at optical frequencies $\Omega \pm \omega_c$. Here, $1 \leq m \leq M$ indexes the sensors. Suppose the probed RF field at the m-th sensor is represented by the waveform $\varepsilon_m(t) = E_m \cos(\omega_c t + \varphi_m)$, where $\omega_c$ is the carrier frequency of the RF field, $E_m$ is the RF-field amplitude, and $\varphi_m$ is the RF-field phase. The EOM transducts the RF field into a phase modulation on the optical field so that the spectral mode $\hat{a}_\omega e^{-i\omega t}$ at ω becomes $$\hat{a}_\omega e^{-i\omega t} e^{i\zeta E_m \cos(\omega_c t + \varphi_m)} = \hat{a}_\omega \sum_{n=-\infty}^{\infty} i^n J_n(A_m) e^{i(-(\omega - n\omega_c)t + n\varphi_m)}, \quad (S1)$$

where the Jacobi-Anger expansion has been employed, $J_n(z)$ is the n-th Bessel function of the first kind. Here $A_m = \zeta E_m$, where $\zeta = \pi \gamma / V_\pi$ accounts for the RF-to-photonic conversion efficiency and the conversion from an external electric field to the applied voltage on the EOM by an antenna as modeled by γ. Effectively, the spectral mode $\hat{a}_\omega$ undergoes a frequency-domain beam splitter transform and is spread over to the spectral modes $\omega - n\omega_c$, n=0, ±1, ±2, .... For small $A_m$, $J(A_m) \sim (A_m)^n 2^{-n}/n!$ decays quickly with n. In a weak RF-field scenario, only the n=0, ±1 components need be considered such that $\hat{a}^{(m)}$'s undergo an effective frequency-domain beam splitter transform, yielding the transformed spectral mode operators $$\hat{a}_c^{(m)\prime} = J_0(A_m)\hat{a}_c^{(m)} + iJ_1(A_m)\hat{a}_-^{(m)} e^{i\varphi_m} + iJ_1(A_m)\hat{a}_+^{(m)} e^{-i\varphi_m} \quad (S2)$$

$$\hat{a}_+^{(m)\prime} = J_0(A_m)\hat{a}_+^{(m)} + iJ_1(A_m)\hat{a}_c^{(m)} e^{i\varphi_m} + iJ_1(A_m)\hat{a}_{2+}^{(m)} e^{-i\varphi_m}$$

$$\hat{a}_-^{(m)\prime} = J_0(A_m)\hat{a}_-^{(m)} + iJ_1(A_m)\hat{a}_{2-}^{(m)} e^{i\varphi_m} + iJ_1(A_m)\hat{a}_c^{(m)} e^{-i\varphi_m},$$

where $\hat{a}_{2\pm}^{(m)}$ are higher-order spectral modes at frequencies $\Omega \pm 2\omega_c$, and $J_{-n}(z) = (-1)^n J_n(z)$ has been used. Initially, all the sideband modes $\hat{a}_\pm^{(m)}$, $\hat{a}_{2\pm}^{(m)}$ are in zero-mean states, while the central spectral mode $\hat{a}_c^{(m)}$ is in a quantum state close to the coherent state $|\alpha_m\rangle$. Thus, $\langle \hat{a}_\pm^{(m)\prime}\rangle = iJ_1(A_m)e^{\pm i\varphi_m}\alpha_m$.

The optical field operator carrying the three spectral modes at sensor m now reads $$\hat{E}^{(m)}(t) = \hat{a}_c^{(m)\prime} e^{-i\Omega t} + \hat{a}_+^{(m)\prime} e^{-i(\Omega + \omega_c)t} + \hat{a}_-^{(m)\prime} e^{-i(\Omega - \omega_c)t}. \quad (S3)$$

Let the LO optical field be $E_{LO}^{(m)}(t) = E_{LO} e^{-i(\Omega t + \theta)}$, where $E_{LO}$ is real. The balanced homodyne measurement generates a photocurrent $$I(t) = \text{Re}[\hat{E}^{(m)} E_{LO}^{(m)*}] = \text{Re}[E_{LO} e^{i\theta}(\hat{a}_c^{(m)\prime} + \hat{a}_+^{(m)\prime} e^{-i\omega_c t})] \quad (S4)$$

where the electron charge q=1 for theoretical convenience.

An electronic mixer supplied by an RF LO at $\omega_c$ and with a phase $\phi_0$ is then applied on the photocurrent, i.e. $\cos(\omega_c t + \phi_0)$, moving the photocurrent's spectral component at $\omega_c$ to the baseband. After filtering, the baseband photocurrent reads $$I_B^{(m)}(t) = -\text{Re}[e^{i\theta}\hat{b}^{(m)\prime}], \quad (S5)$$

where $$\hat{b}^{(m)\prime} \equiv \frac{e^{i\phi_0}\hat{a}_+^{(m)\prime} + e^{-i\phi_0}\hat{a}_-^{(m)\prime}}{\sqrt{2}}. \quad (S6)$$

In doing so, one only needs to consider measurements on the effective mode $\hat{b}^{(m)\prime}$ in estimating the parameters of the probed RF field. Likewise, a corresponding effective mode before the RF-to-photonic transduction is defined as $$\hat{b}^{(m)} \equiv \frac{e^{i\phi_0}\hat{a}_+^{(m)} + e^{-i\phi_0}\hat{a}_-^{(m)}}{\sqrt{2}}. \quad (S7)$$

Derived from Eqn. S2, the transform of the effective mode through the transduction is $$\hat{b}^{(m)\prime} = J_0(A_m)\hat{b}^{(m)} + i\sqrt{2}J_1(A_m)\cos(\phi_0 + \varphi_m)\hat{a}_c^{(m)} + v.c., \quad (S8)$$

where v.c. are the vacuum modes and higher order zero-mean modes. For $A_m \ll 1$ and $|\alpha_m| \gg 1$, the evolution of $\hat{b}_m$ through the transduction is well described by a first-order approximation, giving a displacement of $i\sqrt{2}J_1(A_m)\cos(\phi_0 + \varphi_m)\alpha_m$ on $\hat{b}_m$ on the phase quadrature. Thus, to access the displacement, the LO phase needs to be set to $\theta = \pi/2$ to observe the phase quadrature of $\hat{b}^{(m)}$, i.e., $I_B^{(m)}(t) = \text{Im}[\hat{b}^{(m)\prime}]$, as experimentally verified by the sinusoidal signal in FIG. 7B. Moreover, because the RF-field information is transferred to the phase quadrature of the effective mode, a quantum enhancement in the measurement sensitivity requires that the effective mode is in a phase squeezed state. This is achieved by setting the OPA to operate in a parametric amplification regime.

To measure a RF-field phase $\varphi_m \ll 1$, $\phi_0$ was set to $\mp\pi/2$. The effective mode, up to the leading order, then becomes $$\hat{b}^{(m)\prime} = J_0(A_m)\hat{b}^{(m)} + g_m i\sqrt{2}J_1(A_m)\varphi_m \hat{a}_c^{(m)} + v.c., \quad (S9)$$

where $g_m = \pm 1$ can be tuned by the sign of $\phi_0$. Here by expanding $J_1(A_m) \simeq A_m/2 = \pi\gamma E_m/(2V_\pi)$ and replacing $\hat{a}_c^{(m)}$ with its mean $a_c^{(m)}$, the second term becomes $i\pi g_m \sqrt{2}a_c^{(m)}\gamma E_m/(2V_\pi) \varphi_m$, i.e., a displacement on the phase quadrature. This expression also agrees with Eqn. 2.

Entangled RF-Photonic Sensor Network

Figure 10:
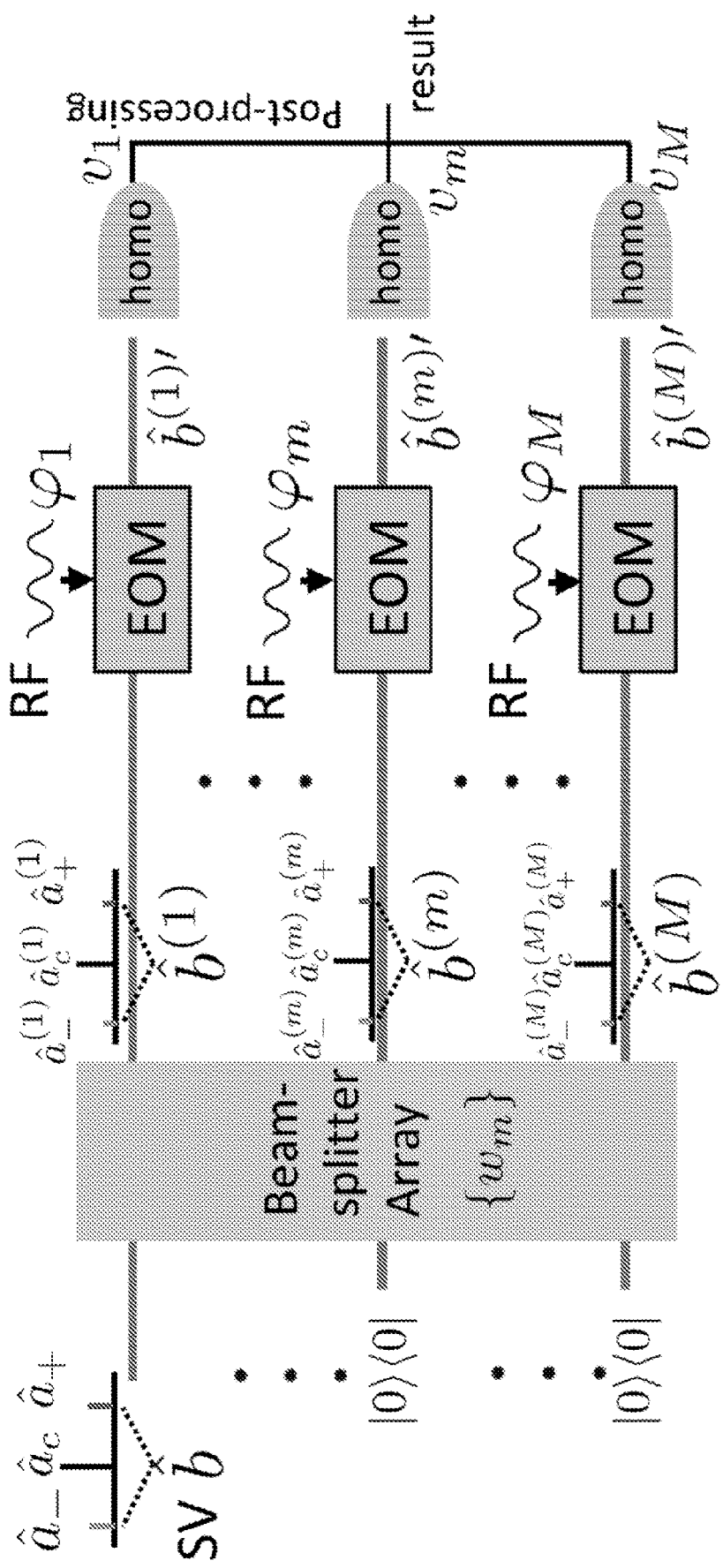
FIG. 10 illustrates a theoretical model for an entangled RF-photonic sensor network, in an embodiment.

FIG. 10 illustrates a theoretical model for an entangled RF-photonic sensor network. To apply the DQS protocol to an entangled RF-photonic sensor network, the quantum source first effectively generates a single-mode squeezed vacuum mode $\hat{b}=i(\hat{a}_+-\hat{a}_-)/\sqrt{2}$, where $\hat{a}_\pm$ are the sideband modes. Subsequently, a beam splitter array with weights $\{w_m, 1\leq m\leq M\}$ ($\Sigma w_m^2=1$) produces the modes $\hat{b}^{(m)}=i(\hat{a}_+^{(m)}-\hat{a}_-^{(m)})/\sqrt{2}$ that are distributed to different sensors. In the experiment, such a state is produced with a two-mode squeezed vacuum state between the sideband modes $\hat{a}_\pm$ such that $\langle\hat{a}_+\hat{a}_-\rangle=\sqrt{N_S(N_S+1)}e^{i\tau}$ and $\langle\hat{a}_+^2\rangle=\langle\hat{a}_-^2\rangle=0$, where $N_S$ is the mean photon number. The variance of the phase quadrature $\langle\text{Im}[\hat{b}]^2\rangle=(2N_S+1-2\cos\tau\sqrt{N_S(N_S+1)})/4$. Choosing $\tau=0$, the variance is minimized to $$\langle\text{Im}[\hat{b}]^2\rangle = \frac{1}{4}\frac{1}{(\sqrt{N_S}+\sqrt{N_S+1})^2}, \quad (S10)$$

so that a squeezed vacuum state is generated at the effective mode $\hat{b}$.

In FIG. 10, "SV" means squeezed vacuum, "EOM" means electro-optic modulator, and "homo" means homodyne measurement. At the quantum source, the sideband modes $\hat{a}_\pm$ are entangled in a two-mode squeezed state, leading to the effective mode $\hat{b}=i(\hat{a}_+-\hat{a}_-)/\sqrt{2}$ in a phase SV state. The central spectral mode $\hat{a}_c$ is close to a coherent state $|\alpha\rangle$. A beam splitter array with weights $\{w_m, 1\leq m\leq M\}$ generates the CV multipartite entangled state of the effective modes $\{\hat{b}^{(m)}, 1\leq m\leq M\}$. Each $\hat{b}^{(m)}=i(\hat{a}_+^{(m)}-\hat{a}_-^{(m)})/\sqrt{2}$ accounts for two sideband modes. The EOM transducts the RF signal into optical field quadrature displacements. Postprocessing of homodyne measurement results at all sensors generates a sum with weights $\{v_m, 1\leq m\leq M\}$, which is used to infer the average RF-field amplitude or the AoA.

In the beam splitter array, all spectral modes undergo the same transform. Thus, the central spectral modes $\hat{a}_c^{(m)}$ at different sensors are also generated by splitting the central spectral mode $\hat{a}_c$ at the source. Prior to the EOM at each sensor, $\hat{b}^{(m)}=w_m\hat{b}+$v.c., $\hat{a}_c^{(m)}=w_m\hat{a}_c+$v.c., and the effective mode after the EOM becomes $$\hat{b}^{(m)'}=J_0(A_m)w_m\hat{b}+g_m w_m i\sqrt{2}J_1(A_m)\varphi_m\hat{a}_c+v.c., \quad (S11)$$

on which the phase quadrature $I_B^{(m)}(t)=\text{Im}[\hat{b}^{(m)'}]$ is measured.

Suppose the global parameter to be estimated is $\bar{\varphi}=\Sigma_m c_m\varphi_m$, with weights being $c_m$ real. To obtain an estimation, a suitable set of $w_m$'s is required, and postprocessing on measurement outcomes of all sensors is further needed to construct an unbiased estimator $$\hat{L} = s\sum_m v_m I_B^{(m)}(t) = s\text{Im}\left[\sum_m v_m \hat{b}^{(m)'}\right], \quad (S12)$$

where the weights $v_m$ are real and normalized, $\Sigma_m v_m^2=1$, and $s>0$ is a scaling factor. The unbiased condition requires the expectation value $$\langle\hat{L}\rangle = s\sum_m v_m g_m w_m \varphi_m \beta = \sum_m c_m\varphi_m, \quad (S13)$$

where $\sqrt{2}J_1(A_m)\alpha=\beta$ is fixed. Thus, the chosen $v_m$, $w_m$'s need to make $c_m=sg_m v_m w_m\beta$, $\forall m$.

To use the phase squeezed state in the $\hat{b}$ mode to minimize the variance of the estimator, $v_m=w_m$ is needed, and consequently the optimum choices of the parameters are $$w_m^{opt} = \frac{\sqrt{|c_m|}}{\sqrt{\sum|c_m|}}, \quad g_m^{opt} = \text{sign}(c_m), \quad s^{opt} = \frac{\sum|c_m|}{\beta}. \quad (S14)$$

The minimum variance is thus $$\text{var}(\hat{L})^{opt}=(\Sigma|c_m|/\beta)^2\langle\text{Im}[\hat{b}]^2\rangle, \quad (S15)$$

where the variance of the phase squeezed state is given by Eqn. S10.

To show that the weights $w_m^{opt}$'s indeed yield the optimum entanglement-enhanced estimation performance, a set of sub-optimum weights $\{w_m, 1\leq m\leq M\}$ is chosen and the associated postprocessing weights $\{v_m, 1\leq m\leq M\}$ to maintain an unbiased estimator, as specified in Eqn. S13. The estimator variance is then derived as following. Denote the effective modes as $\hat{b}'=(\hat{b}^{(1)'}, \ldots, \hat{b}^{(M)'})^T$, obtained from a beam splitter transform $T=(w, T_1)$ on mode $\hat{b}$ and vacuum modes $\hat{e}=(\hat{e}_2, \ldots, \hat{e}_M)$. Here, $w=(w_1, \ldots, w_M)^T$, i.e., $\hat{b}'=(w, T_1)(\hat{b}, \hat{e})^T$. From the orthogonality condition, $T^T T=TT^T=I_M$, one has $w^T w=1$, $w^T T_1=0$, $T_1^T T_1=I_{M-1}$, and $ww^T+T_1T_1^T=I_{M-1}$. Here, $I_L$ is an L×L identity matrix. Let $v=(v_1, \ldots, v_M)^T$, the estimator is then written as $\hat{L}=s\text{Im}[v^T T(\hat{b}, \hat{e})^T]$. Thus, the variance of the estimator $$\text{var}(\hat{L}) = s^2 v^T T\text{Diag}\left[\langle\text{Im}[\hat{b}]^2\rangle, \frac{1}{4}I_{M-1}\right]T^T v \quad (S16)$$

$$= s^2(v^T w)^2\langle\text{Im}[\hat{b}]^2\rangle + \frac{1}{4}s^2 v^T T_1 T_1^T v$$

$$= s^2(v^T w)^2\left(\langle\text{Im}[\hat{b}]^2\rangle - \frac{1}{4}\right) + \frac{1}{4}s^2 v^T v$$

$$= \frac{1}{\beta^2}\left[\left(\sum_{m=1}^M g_m c_m\right)^2\left(\langle\text{Im}[\hat{b}]^2\rangle - \frac{1}{4}\right) + \frac{1}{4}\left(\sum_{m=1}^M \frac{c_m^2}{w_m^2}\right)\right],$$

where $$v^T w = \sum_{m=1}^M g_m c_m/s\beta$$

and $$v^T v = \sum_{m=1}^M c_m^2/(s^2 w_m^2 \beta^2)$$

have been used. Again, the variance of the phase squeezed state is given in Eqn. S10. To rederive the optimum parameters $w_m$'s and $g_m$'s, the constraint $$\sum_{m=1}^M w_m^2 = 1$$

is considered. Using Lagrangian multipliers, it can be shown that $w_m \propto \sqrt{|c_m|}$. Since $\langle\text{Im}[\hat{b}]^2\rangle-1/4\leq 0$ due to squeezing, $g_m=\text{sign}(c_m)$ is needed. The same solution as in Eqn. S14 for the optimum parameters is then derived.

The above analysis applies to an ideal lossless situation. In a practical scenario, however, loss $1-\eta$ is present at each sensor. Effectively, loss can be accounted for at the source by replacing Eqn. S10 with $$\langle\mathrm{Im}[\hat{b}]^2\rangle = \frac{1}{4}\left[\frac{\eta}{\left(\sqrt{N_s} + \sqrt{N_s+1}\right)^2} + (1-\eta)\right], \quad (S17)$$

where $\eta$ is the transmissivity. The optimum solutions in Eqns. S14 and S15, as well as the variance in Eqn. S16 remains valid with $\beta = \sqrt{\eta}\sqrt{2}J_1(A_m)\alpha$.

Performance Analysis

To compare the performance of quantum sensing protocols, one should first identify the resource constraints. Various theoretical works simply consider an energy constraint, i.e., by fixing the total mean photon numbers employed in different protocols under comparison. The energy constraint is valid in scenarios where the interrogated sample is sensitive to the probe power caused by, e.g., photodamage or self-concealing. In RF-photonic sensing and LIGO, however, the optical power should ideally be cranked up as much as one can until the device power accommodation limit is arrived. Therefore, in an RF-photonic sensor, the power carried by the central mode $\hat{a}_c$ needs be large, subject to the operational limit of the device. For example, integrated RF-photonic sensors can accommodate milliwatts of optical power. In a classical separable RF-photonic sensor network, the effective mode $\hat{b}$ is in a vacuum state, and the laser power distribution to different sensors is optimized through tuning the beam-splitter ratios.

In an entangled RF-photonic sensor network, phase squeezed light resides in the effective mode $\hat{b}$. Because the experimental energy the squeezed state $N_S \ll |\alpha|^2$, it is negligible, as compared to that of the central spectral mode. As such, the performance comparison between the classical separable and entangled sensor networks is based on setting the classical scheme's $\hat{b}$ in a vacuum state and the entangled scheme's $\hat{b}$ to a squeezed state while employing identical energies on the central spectral modes for both cases. The estimation variances for both schemes are modeled by Eqn. S15, with $\langle\mathrm{Im}[\hat{b}]^2\rangle$ given in Eqn. S17 for the entangled sensor network and $\langle\mathrm{Im}[\hat{b}]^2\rangle = 1/4$ for the classical separable sensor network.

To show that the quantum state shared by the sensors is indeed entangled, a theoretical comparison is performed between the DQS scheme and the optimum separable scheme, subject to a total photon number constraint in the $\hat{b}_m$ modes for both cases. In the absence of loss, the optimum separable DQS utilizes $\{\hat{b}^{(m)}, 1 \leq m \leq M\}$ modes in a product of squeezed vacuums, with the optimum mean photon number distribution $N_s^{(m)}$ under the constraint $$\sum_{m=1}^{M} N_s^{(m)} = N_S.$$

Suppose the same beam splitter array is used to distribute the central spectral mode's coherent state to different sensors, the unbiased estimator condition remains the same as Eqn. S13. Now, the $\hat{b}^{(m)'}$ modes are separable, each having a variance of $$\mathrm{var}\left(\mathrm{Im}\left[\hat{b}^{(m)'}\right]\right) = \frac{1}{4}\left[\frac{\eta}{\left(\sqrt{N_s^{(m)}} + \sqrt{N_s^{(m)}+1}\right)^2} + (1-\eta)\right]. \quad (S18)$$

Akin to Eqn. S16, the estimation variance $$\mathrm{var}(\hat{L}) = \sum_{m=1}^{M} \frac{c_m^2}{w_m^2 \beta^2} \mathrm{var}\left(\mathrm{Im}\left[\hat{b}^{(m)'}\right]\right). \quad (S19)$$

For a set of fixed $w_m$'s, one optimizes $N_s^{(m)}$ to minimize the estimation variance. One can show the overall minimum is achieved at $w_m^2 \propto c_m \sqrt[4]{\mathrm{var}(\mathrm{Im}[\hat{b}^{(m)'}])}$:

$$\mathrm{var}(\hat{L})^* = \min_{\sum_m N_s^{(m)} = N_S} \sum_{m=1}^{M} \frac{c_m}{\beta} \sqrt{\mathrm{var}\left(\mathrm{Im}\left[\hat{b}^{(m)'}\right]\right)}. \quad (S20)$$

In the experiment, at the source the anti-squeezing level was measured to be ~10 dB above the shot-noise level and the squeezing level was ~4 dB below the shot-noise level, from which it can be inferred that the ideal source squeezing was ~11.7 dB and mean photon number $N_S$~3.3. In the field amplitude measurement, the measured squeezing was ~3.2 dB (noise variance ~0.48 of that of the shot noise) for the three senor network case. Thus, the overall efficiency $\eta$~0.56 are then derived. With equal weights, the optimum separable scheme employs ~7.9 dB of squeezing at the local source, to match the total mean photon number in squeezing, and achieves a 2.7 dB of noise reduction (noise variance ~0.53 of the shot noise). This leads to a ~10% advantage in estimation variance for our experimental result over that of the optimum separable sensor network, thereby verifying the entanglement shared by the sensors.

It is worth noting that the optimum separable RF-photonic sensor network discussed above requires that each sensor has its own squeezed-light source, which induces a substantial resource overhead.

Finite Difference Method for the Estimation of AoA of the RF Field

Figure 11:
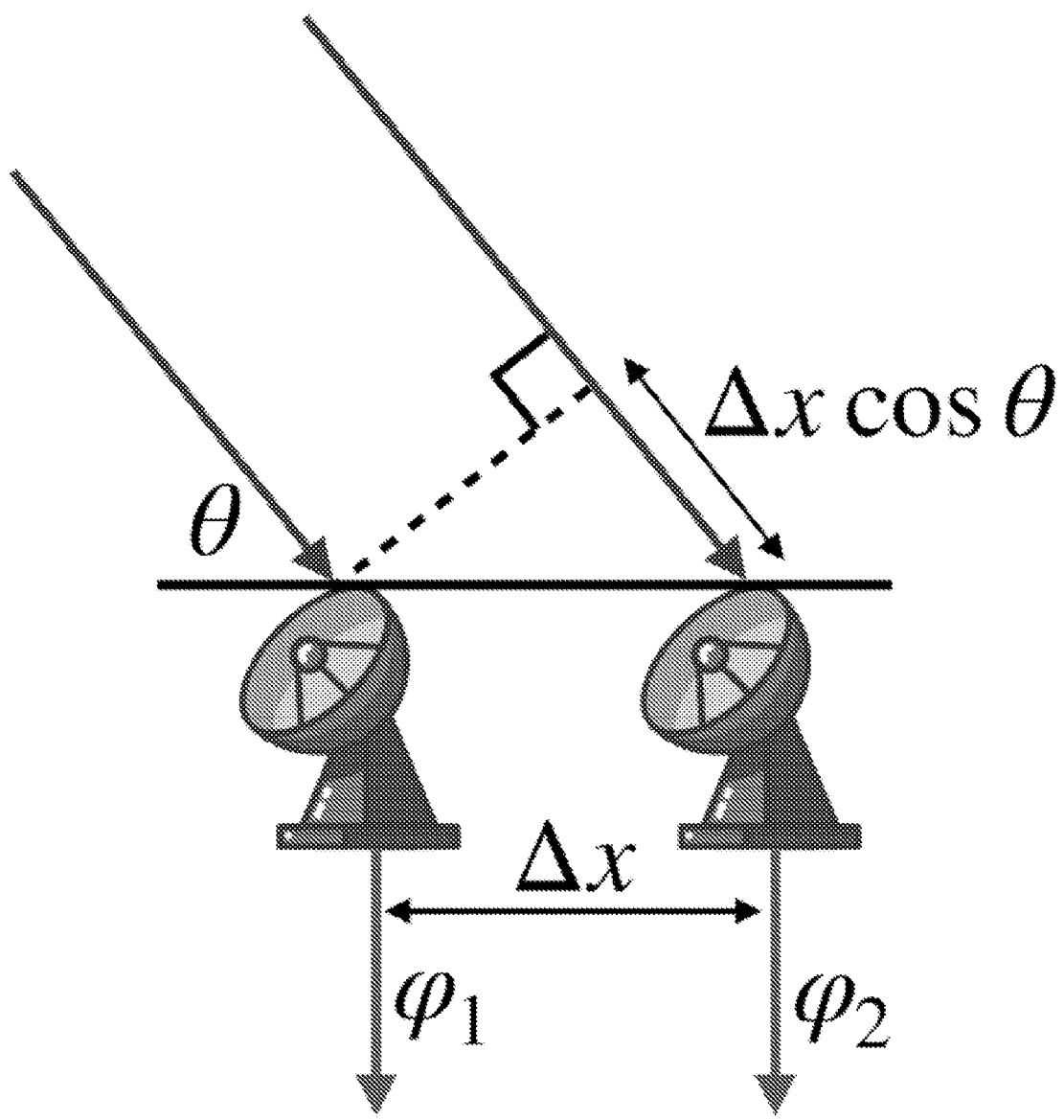
FIG. 11 illustrates a scheme to measure the AoA of an incident RF based on the phase difference measured at two RF sensors, in an embodiment.

FIG. 11 illustrates a scheme to measure the AoA of an incident RF based on the phase difference measured at two RF sensors. The AoA $\theta$ is related to the relative phase of the two sensors by $$\frac{\varphi_2 - \varphi_1}{2\pi} = \frac{\Delta x \cos\theta}{\lambda} + k, \quad (S21)$$

where $\lambda$ is the wavelength of the RF field, and k is an integer. k can be set to 0, if the sensors are located close to a less than a wavelength, i.e., $\Delta x/\lambda \ll 1$, but the measurement of the AoA, in general, is not restricted to this assumption. The AoA can then be estimated as $$\theta = \arccos\frac{(\varphi_2 - \varphi_1)\lambda}{2\pi\Delta x}. \quad (S22)$$

Since both $\lambda$ and $\Delta x$ are predetermined, the measurement of the AoA of an RF field is transformed into a difference phase estimation problem undertaken by the two sensors, which is a focus of the following discussion.

Consider the three-point case, $x_1 < x_2 < x_3$, and suppose the weights are $c_1, c_2, c_3$. The estimator is $$\hat{L} = c_1\varphi(x_1) + c_2\varphi(x_2) + c_3\varphi(x_3). \quad (S23)$$

Case 1. Phase-difference estimation at a central node.

$$\varphi(x_1) = \varphi(x_2) - \varphi^{(1)}(x_2)\Delta x + \frac{1}{2}\varphi^{(2)}(x_2)\Delta x^2 + O(\Delta x^3), \quad (S24)$$

$$\varphi(x_3) = \varphi(x_2) + \varphi^{(1)}(x_2)\Delta x + \frac{1}{2}\varphi^{(2)}(x_2)\Delta x^2 + O(\Delta x^3).$$

One requires $c_3=1+c_1$, $c_2=-1-2c_1$ to ensure the expectation value $\langle\hat{L}\rangle=\varphi^{(1)}(x_2)\Delta x+O(\Delta x^2)$. In particular requiring $c_1+c_3=0$ or $(c_1, c_2, c_3)=(-1/2, 0, 1/2)$ yields $\langle\hat{L}\rangle=\varphi^{(1)}(x_2)\Delta x+O(\Delta x^3)$.

With the proper chosen weights in Eqn. S14, the variance in Eqn. S15 is $$\text{var}(\hat{L})=(\Sigma|c_m|/\beta)^2\langle\text{Re}\hat{b}^2\rangle\propto(|c_1|+|1+2c_1|+|1+c_1|)^2. \quad (S25)$$

Eqn. S25 is minimized when $c_1=-1/2$. Thus, it is always optimum to use $(c_1, c_2, c_3)=(-1/2, 0, 1/2)$, because this minimizes both the estimation variance and the discretization error for the phase gradient.

Case 2. —Phase-difference estimation at an edge node.

$$\varphi(x_2) = \varphi(x_1) + \varphi^{(1)}(x_1)\Delta x + \frac{1}{2}\varphi^{(2)}(x_1)\Delta x^2 + O(\Delta x^3), \quad (S26)$$

$$\varphi(x_3) = \varphi(x_1) + \varphi^{(1)}(x_1)2\Delta x + \frac{1}{2}\varphi^{(2)}(x_2)4\Delta x^2 + O(\Delta x^3).$$

One requires $c_2=1-2c_3$, $c_1=c_3-1$ to ensure the expectation value $\langle\hat{L}\rangle=\varphi^{(1)}(x_1)\Delta x+O(\Delta x^2)$. If $c_2+4c_3=0$ is required, then $(c_1, c_2, c_3)=(-3/2, 2, -1/2)$ and $\langle\hat{L}\rangle=\varphi^{(1)}(x_1)\Delta x+O(\Delta x^3)$.

A similar analysis can be performed for the second-order derivative, except that there is only one possible set of parameters for each case. To estimate at a central node, one needs $c_1=c_3=1/2$, $c_2=-1$, so $\langle\hat{L}\rangle=\varphi^{(2)}(x_2)\Delta x^2+O(\Delta x^4)$. To estimate at an edge node, one needs $c_1=1$, $c_2=-2$, $c_3=1$, so $\langle\hat{L}\rangle=\varphi^{(2)}(x_1)\Delta x^2+O(\Delta x^3)$.

Experimental Details

Detailed Description of the Experimental Setup

Figure 12:
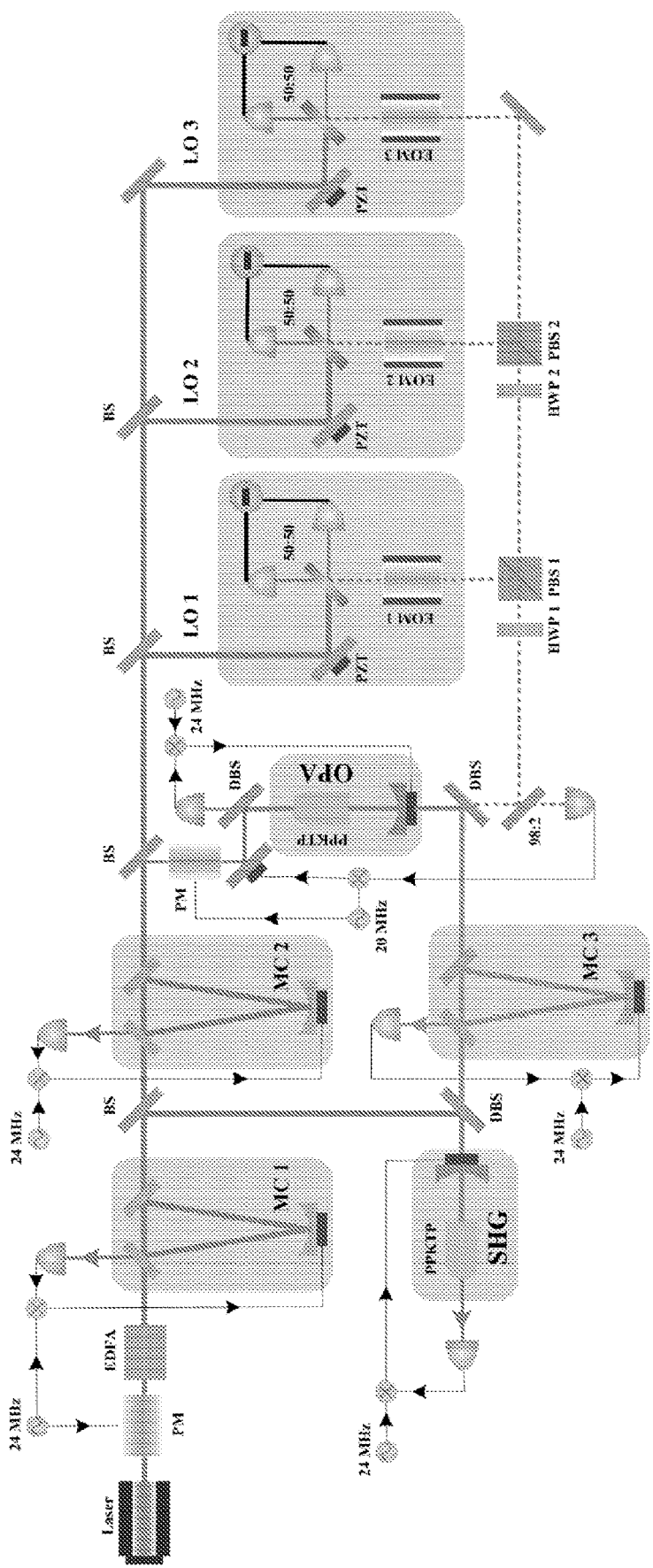
FIG. 12 is a more detailed diagram of the experimental setup shown in FIG. 6B, in an embodiment.

FIG. 12 is a more detailed diagram of the experimental setup shown in FIG. 6B. A 1550-nm mode-hop-free semiconductor laser (New Focus Velocity TLB-6728) generates ~10 mW of light, which is modulated by a fiber-based phase modulator (PM) driven by a 24-MHz signal to create two sidebands for cavity locking based on the Pound-Drever-Hall (PDH) technique. The modulated light is subsequently boosted to ~1 W by an erbium-doped fiber amplifier (EDFA) and coupled to free space. The 1550-nm light is first filtered by a locked 1550-nm mode-cleaning cavity (MC) and then split into two arms to serve, respectively, as the pump for second-harmonic generation (SHG) and the LO for homodyne measurements. The semi-monolithic SHG cavity entails a curved cavity mirror with 10% reflectivity at 775 nm and 94% reflectivity at 1550 nm and a type-0 periodically-poled KTiOPO$_4$ (PPKTP) crystal temperature stabilized at 34.0° C. The PPKTP crystal has a curved facet being highly reflective at 1550 nm and 775 nm and a plat facet that is anti-reflection coated at both wavelengths. The SHG cavity is locked using the 24-MHz sideband and generates ~300 mW of 775-nm light under a 500-mW 1550-nm pump. The 775-nm light is first filtered by a locked 775-nm MC and then injected through a curved cavity mirror into an OPA cavity where a second identical PPKTP crystal temperature stabilized at 40.5° C. is embedded. The curved mirror of the OPA cavity has 95% reflectivity at 775 nm and 87.5% reflectivity at 1550 nm. To generate phase squeezed light, a weak 1550-nm beam is tapped from the LO and modulated by a free-space PM to create 20-MHz sidebands. The modulated weak 1550-nm beam is reflected on a 775-nm/1550-nm dichroic beam splitter (DBS) and then seeds the OPA cavity. The OPA cavity is locked by the 24-MHz sideband of the 775-nm light that transmits through the DBS. 2% of the 1550-nm output from the OPA curved cavity mirror is tapped and is employed to lock the phase between the 1550-nm seed beam and the 775-nm pump using the 20-MHz sidebands so that the OPA operates in a parametric amplification regime. When phase locked, the OPA cavity emits quantum light composed of an effective squeezed vacuum state residing in the 11-MHz sideband modes while the central spectral mode is a displaced phase squeezed state. Due to the large quadrature displacement, the central spectral mode can be well approximated by a classical coherent state. The single spatial-mode quantum light is diverted into three RF-photonic sensors by two variable beam splitters (VBSs), each consisting of a half-wave plate (HWP) and a polarizing beam splitter (PBS). The splitting ratios of both VBSs determines the CV multipartite entangled state. Each RF-photonic sensor is equipped with an EOM driven by the probed RF signal with 11-MHz carrier frequency. Due to the phase modulation, a portion of the coherent state in the central mode is transferred to quadrature displacement at the 11-MHz sidebands that accommodate the phase squeezed state. The magnitude of the quadrature displacement is dependent on the amplitude and phase of the probed RF field, as described by Eqn. 1. After the EOM, the quantum signal and the LO interfere on a 50:50 BS. By fine tuning the spot sizes of both beams, a classical interference visibility in excess of 97% was achieved at each sensor. The two outputs of the BS are detected by two photodiodes, each with ~88% quantum efficiency, in a balanced homodyne configuration. The difference photocurrent is amplified by an transimpedance amplifier with a gain of $20\times10^3$ V/A. The DC component of the output voltage signal is utilized to lock the phase between the LO and the quantum signal so that the LO always addresses the squeezed phase quadrature with the displacement. The 11-MHz component of the voltage signal from each sensor is first demodulated by an electronic mixer, filtered by a 240-kHz low-pass filter, and recorded by an oscilloscope (LeCroy WaveRunner 8404 M) with a 4-GHz analog bandwidth (only 200 MHz bandwidth was used) at a 50 M Samples/s/channel sampling rate. Postprocessing derives the estimation and measurement noise variances.

Calibration of the shot-noise and squeezing levels. The shot-noise (squeezing) level is represented by the red (blue) curve, while the electronic noise floor is plotted in the yellow curve as a comparison. All measurements were taken with a resolution bandwidth of 300 kHz and a video bandwidth of 300 Hz.

Calibration of Shot Noise and Squeezing Levels

Figure 13:
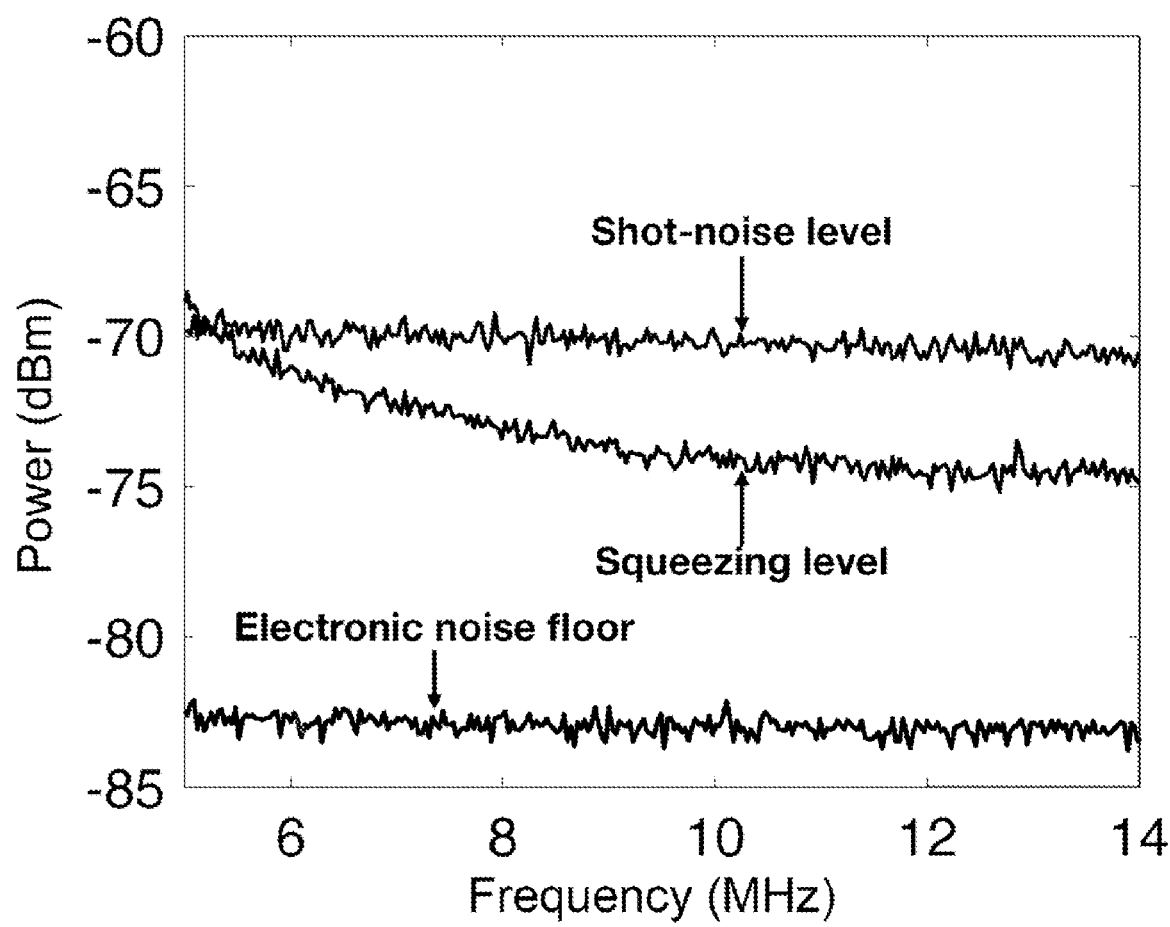
FIG. 13 is a plot of spectrum-analyzer traces showing calibration of the shot noise and squeezing levels.

FIG. 13 is a plot of spectrum-analyzer traces showing calibration of the shot noise and squeezing levels. To obtain this data, a local oscillator with 14.1 mW of power was fed to the homodyne detector of Sensor 1 while the signal input to the detector was blocked. Setting the resolution bandwidth of the RF spectrum analyzer to 300 kHz and the video bandwidth to 300 Hz, the noise power spectrum of the homodyne detector was found to be flat beyond 1.9 MHz, showing shot-noise limited behavior (see the top trace in FIG. 13). The measured shot-noise level agreed precisely with a model that accounted for the local oscillator power, detector quantum efficiency, the gains of the amplifiers, and the resolution bandwidth of the RF spectrum analyzer. As a comparison, the electronic noise floor of the homodyne detector was measured by blocking the local oscillator, and is shown as the bottom trace in FIG. 13. The shot-noise level was found to be 13 dB higher than the electronic noise floor, allowing for the observation of sub-shot-noise behavior enabled by squeezed light.

The squeezing level was then measured at different RF frequencies. In the measurement, the OPA was locked to operate in the parametric amplification regime to produce phase squeezed light, and the relative phase between the squeezed light and the local oscillator was locked to $\pi/2$ so that the local oscillator was ensured to address the phase quadrature of the squeezed light. Sub-shot-noise behavior was observed at frequencies higher than ~5.5 MHz. The measured squeezing level is shown in the middle trace of FIG. 13. Squeezing was not observed at lower frequencies, likely due to the residue amplified spontaneous emission noise and the Brillouin scattering noise after the mode-cleaning cavities. Using mode-cleaning cavities with narrower linewidths, one may observe squeezing at lower frequencies. At 11 MHz, the carrier frequency of the probed RF field, the observed squeezing level was ~4 dB, consistent with other experimental data.

Performance of Individual Sensors

Figure 14C:
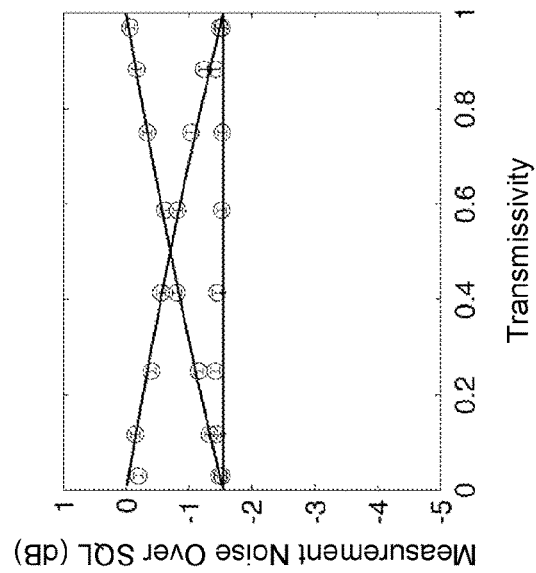
FIGS. 14A, 14B, and 14C are plot of noise powers for three sensors at different splitting ratios.
Figure 14B:
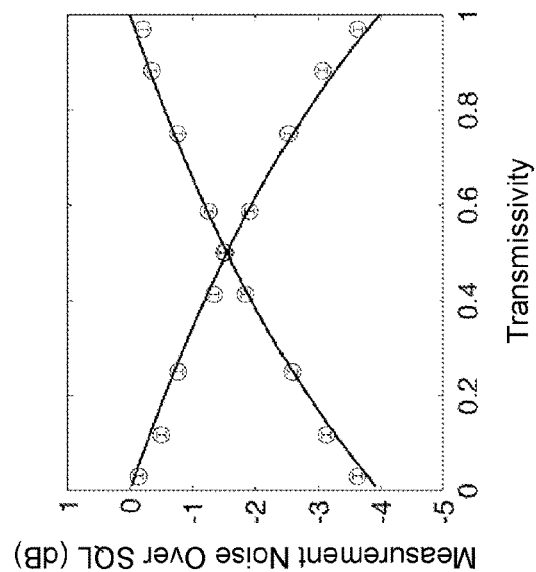
Figure 14A:
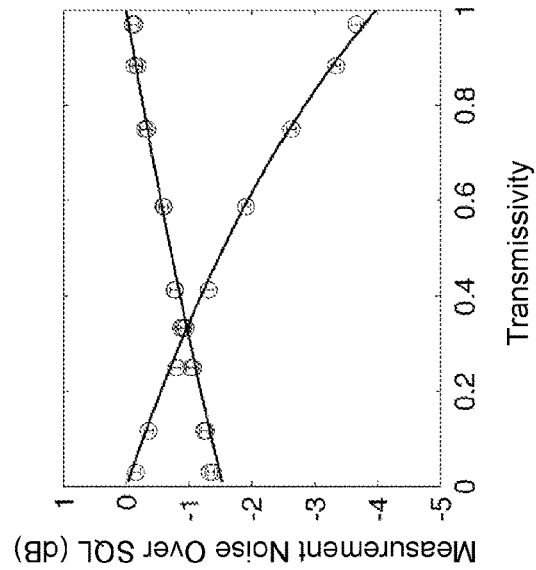

In the entangled sensor network, the three RF-photonic sensors receive different portions of the original squeezed light, based on the splitting ratios of the VBSs determined by a specific distributed sensing task. To quantify the performance of each sensor at a certain input power level, the amount of noise power arising from the homodyne measurements is recorded under different input power levels. The splitting ratio of VBS 2 was fixed at 50:50 while varying the splitting ratio of VBS 1 from 0:100 to 100:0. In doing so, Sensor 1's received portion of the squeezed light varied from 0% to 100%, while Sensor 2 and Sensor 3 equally shared the rest of the power. FIG. 14A is a plot of the resulting noise powers for the three sensors at different splitting ratios of VBS 1. The splitting ratio of VBS 2 was then fixed at 0:100 while varying the splitting ratio of VBS 1 from 100:0 to 0:100. In doing so, the squeezed light was split between Sensor 1 and Sensor 3 with different ratios, while Sensor 2 was unused. The corresponding noise powers for Sensor 1 and Sensor 2 were recorded, and plotted in FIG. 14B. Finally, the splitting ratio of VBS 1 was fixed at 50:50 while that of VBS 2 was varied from 100:0 to 0:100. In this set of measurements, Sensor 1 always received 50% of the squeezed light, while Sensor 2 and Sensor 3 shared the rest 50% with various ratios. The noise powers for all three sensors at different splitting ratios were recorded and plotted in FIG. 14C. In all three sets of measurements, the experimental data are compared with a theoretical model, as depicted in the solid curves. The theory and experimental data agree.

Additional Experimental Data

The phase difference at a central node was estimated, as served by Sensor 2. To do so, the weights for the optimum CV multipartite entangled state was $[1/2, 0, -1/2]$, generated by setting the splitting ratios of VBS 1 and 2 to 50:50 and 0:100. The AoA was emulated by an RF-field phase difference across the three sensors. The negative sign in the weights was introduced by adding a $\pi$-phase delay at Sensor 3. In the measurement, the RF phase at Sensor 1 was swept from 0.17 rad to −0.17 rad, and at the same time the RF phase at Sensor 2 was swept from −0.17 rad to 0.17 rad, while the RF-field amplitudes are set identical. The homodyne data from the three sensors are weighted to obtain an unbiased estimator.

Figure 15B:
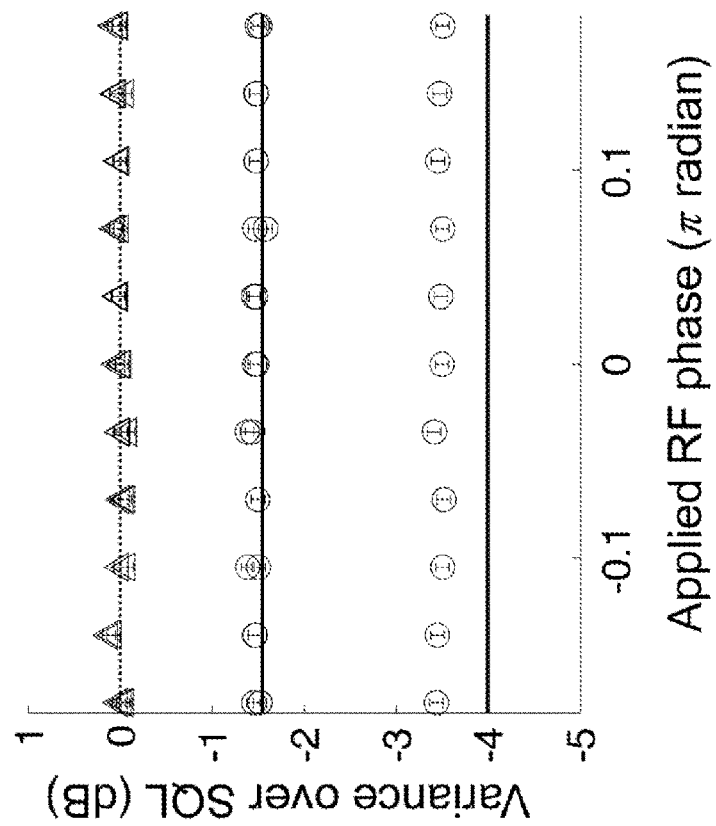
FIG. 15B is a plot of the measurement noise and estimation variances at two sensors in performing phase-difference estimation at a central node.
Figure 15A:
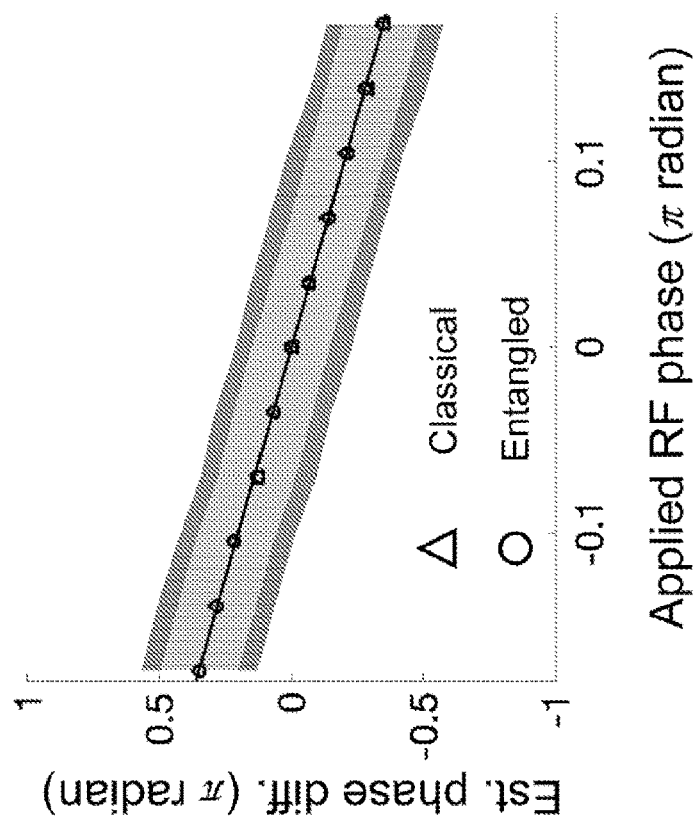
FIG. 15A is a plot of the estimated phase difference at a central node as a function of an applied RF phase.

FIG. 15A is a plot of the estimated phase difference at the central node as a function of applied RF phase. The estimated phase differences are plotted as circles in FIG. 15A and compared to the classical separable scheme (triangles), with the light and dark shaded areas representing the estimation uncertainties for the entangled and classical cases, respectively. FIG. 15A shows a 3.5-dB reduction for the entangled case. FIG. 15B is a plot of the measurement noise and estimation variances at the two sensors in performing the phase-difference estimation at a central node.

Figures 16A, 16B:
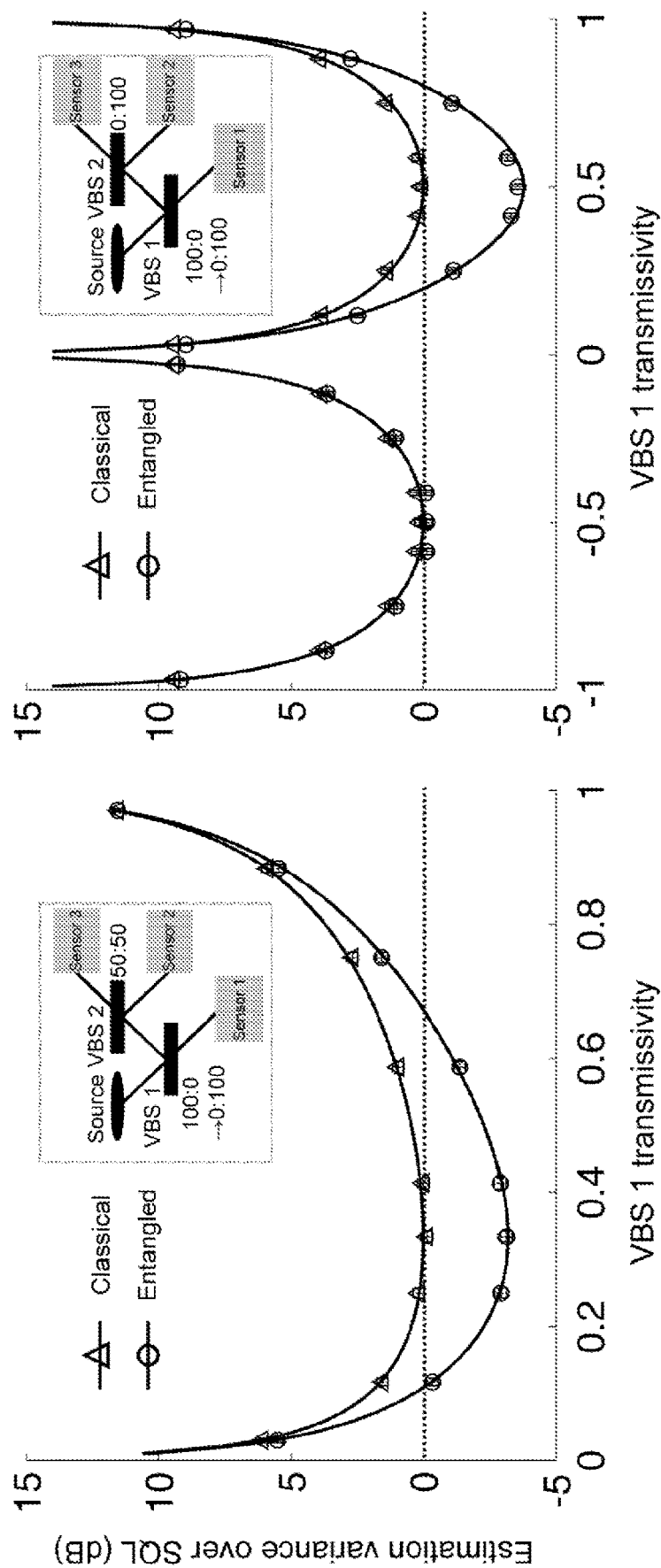
FIG. 16A is plot comparing the estimation variances between the classical separable and entangled sensor networks, in an embodiment.
FIG. 16B is a plot comparing the estimation variances between the classical separable and entangled sensor networks in the task of phase-difference estimation at a central node, in an embodiment.

The estimation variances were measured under different quantum circuit settings for the task of estimating the average RF-field amplitude and the task of estimating the phase difference at a central node. FIG. 16A is plot comparing the estimation variances between the classical separable and entangled sensor networks. To optimize the CV multipartite entangled state, the splitting ratio for VBS 2 was fixed at 50:50 while the splitting ratio for VBS 1 was tuned from 100:0 to 0:100. The largest advantage for the entangled sensor network occurred at a transmissivity of 0.33 for VBS 1, when all sensors received equal amounts of optical power. The experimental data agrees with the theoretical predictions represented by the solid lines. In optimizing the CV multipartite entangled state for phase-difference estimation at a central node, the splitting ratio for VBS 2 was kept 0:100 while the splitting ratio for VBS 1 was tuned between 100:0 to 0:100. The negative sign in transmissivity represents a sign flip on the homodyne data in postprocessing. FIG. 16B is a plot comparing the estimation variances between the classical separable and entangled sensor networks in the task of phase-difference estimation at a central node. As discussed previously, the asymmetric behavior is a signature for the quantum correlations between the measurement noise at different sensors. The experimental data agree with the theoretical model.

Theoretical Model for the Experiment

In the entangled RF-photonic sensor network, let the global parameter to be estimated be a weighted average of the phase of the RF field at different sensors, i.e., $\bar{\varphi} = \sum_m c_m \varphi_m$, with the weights $c_m$'s being real. Also, the estimation of any analytical function of $\varphi_m$'s can be reduced to the estimation of weighted sum by linearization and adopting adapativity. The average field-amplitude estimation problem can be formulated in a similar way. Under beam splitter ratios $\{w_m\}$ for amplitude and $\{g_m = \pm 1\}$ determined by RF phase delays at the sensors, the estimation variance can be derived as $$\text{var} = \frac{1}{\beta^2}\left[\left(\sum_{m=1}^{M} g_m c_m\right)^2 \delta_b + \frac{1}{4}\left(\sum_{m=1}^{M} \frac{c_m^2}{w_m^2}\right)\right].$$

Here, $\beta$ is a coefficient determined by the mean photon number of the baseband light, the transduction efficiency of the EOM, and the system efficiency. $\delta_b = \eta \langle \text{Im}[\hat{b}]^2 \rangle - \eta/4$, with $\langle \text{Im}[\hat{b}]^2 \rangle$ being the variance of the phase squeezed state at the source (shot-noise variance is 1/4) and $1-\eta$ being the overall loss seen by each sensor. $\delta_b = 0$ in the classical separable case and $\delta_b < 0$ in the entangled case. The optimum parameter choices are thus $w_m^{opt} = \sqrt{|c_m|}/\sqrt{\sum |c_m|}$ and $g_m^{opt} = \text{sign}(c_m)$, leading to a minimum estimation variance $(\sum |c_m|)^2 \langle \text{Im}[\hat{b}]^2 \rangle / \beta^2$.

The above result is used to model the experimental data in FIGS. 9, 16A, and 16B. To facilitate the comparison, the minimum estimation variance of a classical separable sensor network, $(\Sigma|c_m|)^2/(4\beta^2)$, is set as the SQL. In FIG. 9, the estimation variances are normalized to the SQL unit. The estimation of the average RF-field amplitude requires $c_1=c_2=c_3=1/3$ and $g_1=g_2=g_3=1$. In the experiment, the splitting ratio of VBS 1, r, is tuned from 0:100 to 100:0 while the splitting ratio of VBS 2 is kept 50:50, so that $w_1=\sqrt{r}$, $w_2=w_3=\sqrt{(1-r)/2}$. This leads to var$=(1/\beta^2)(\delta_b+[1/(1-r)+1/4r]/9)$, with the minimum achieved at $r=1/3$. The theory and the experimental data are plotted in FIG. 16A, showing excellent agreement. The phase difference at a central node was estimated by setting $c_1=1/2$, $c_2=0$, $c_3=-1/2$. The splitting ratio of VBS 1, r, was tuned between 100:0 and 0:100 while the splitting ratio of VBS 2 was kept at 0:100, corresponding to $w_1=\sqrt{|r|}$, $w_2=0$, $w_3=\sqrt{1-|r|}$ and $g_1=\text{sign}(r)$, $g_2=1$, $g_3=-1$. Here, $g_m=-1$ indicates a $\pi$-phase shift on the RF field probed by the m-th sensor, which can be effectively viewed as applying a $\pi$-phase shift on its received entangled state while ensuring an unbiased estimator. For $r>0$, var$_+=(1/\beta^2)(\delta_b+[1/(1-r)+1/r]/16)$, which is minimized at $r=1/2$, as seen in the right half of FIG. 16B. Setting $r<0$ leads to var$_-=(1/\beta^2)[1/(1-|r|)+1/|r|]/16$. Since $\delta_b$ is absent in var$_-$, the estimation variances for the entangled and classical separable cases are identical and are both minimized at $r=-1/2$, as shown in the left half of FIG. 16B. The estimation of the phase difference at an edge node requires $c_1=2$, $c_2=-3/2$, $c_3=-1/2$. The splitting ratio of VBS 1 was kept at 50:50 while the splitting ratio for VBS 2, r, was tuned between 100:0 and 0:100, corresponding to $w_1=\sqrt{1/2}$, $w_2=\sqrt{(1-|r|)/2}$, $w_3=\sqrt{|r|/2}$ and $g_1=1$, $g_2=-1$, $g_3=-\text{sign}(r)$. Setting $r>0$ leads to var$_+=(1/\beta^2)(16\delta_b+[8+9/2(1-r)+1/2r]/4)$, which is plotted with the experimental data in the right half of FIG. 5 of the main text. The minimum estimation variance is achieved at $r=1/4$. Setting $r<0$ leads to var$_-=(1/\beta^2)(9\delta_b+[8+9/2(1-|r|)+1/2|r|]/4)>$var$_+$. The minimum estimation variance is achieved at $r=-1/4$.

Entanglement Distribution

Figure 17:
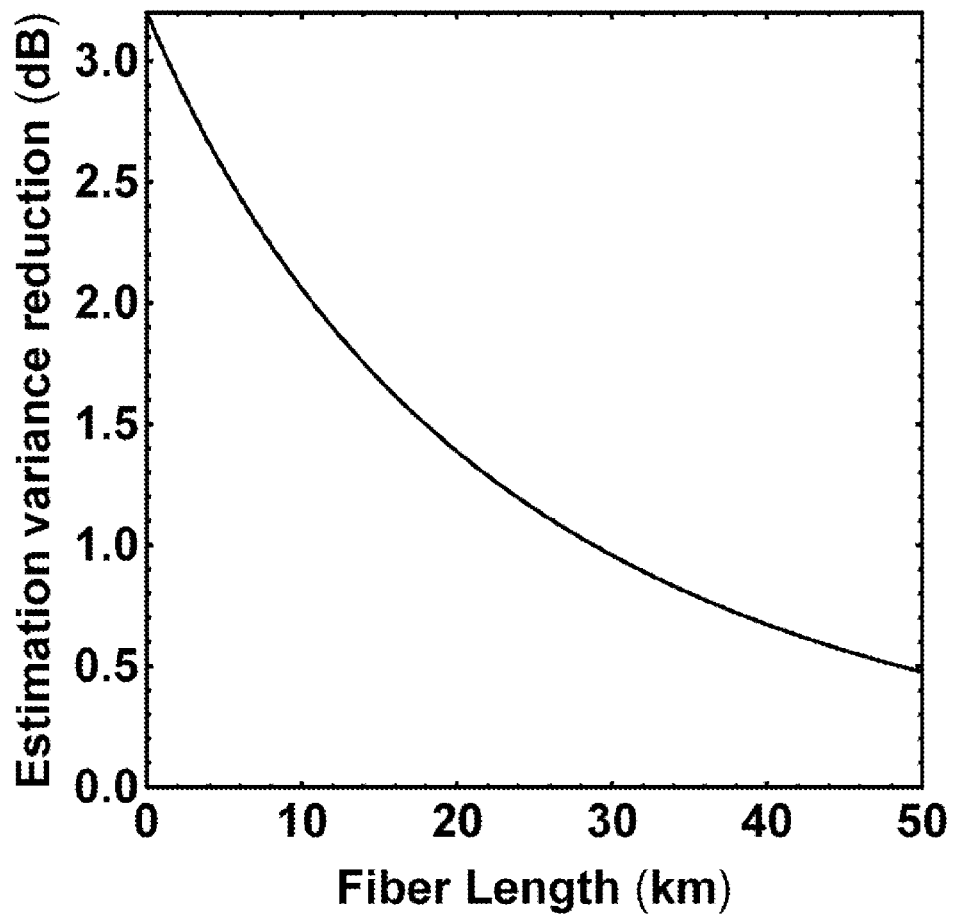
FIG. 17 is a plot of simulated estimation variance reduction as a function of fiber length for an entangled sensor network in which sensors are connected by low-loss optical fibers, in an embodiment.

For sensors spatially separated over a distance, low-loss optical fibers can be used to distributed the CV multipartite entanglement. State-of-the-art low-loss optical fibers have achieved 0.14 dB/km loss, which will allow the entangled sensor network to achieve an appreciable quantum advantage over classical separable sensor networks over a few tens of kilometers. To show the feasibility of entanglement distribution, a simulation was performed for the entangled sensor network connected by low-loss optical fibers using the experimental parameters for the squeezing level, detector efficiency, and additional loss. FIG. 17 is a plot of simulated estimation variance reduction as a function of fiber length for an entangled sensor network in which sensors are connected by low-loss optical fibers (e.g., 0.14 dB/km). FIG. 17 shows a 2-dB (1-dB) estimation variance reduction from the classical separable sensor network for sensors 10 km (30 km) apart from the entanglement source. Note that the entanglement-enhanced measurement sensitivity degrades at longer distances but never diminishes.

Extension to Other Types of Sensing Measurements

CV multipartite entanglement may be advantageously used to enhance distributed sensing of other types of signals. For example, the present embodiments may be used to sense mechanical signals (e.g., acoustic vibrations, seismic motion, inertial acceleration, etc.) by replacing each RF-photonic sensor 130 with an optomechanical sensor. Similar to the RF-photonic sensor 130, the optomechanical sensor imposes a quadrature displacement onto an optical mode based on a received signal. For example, a Michelson interferometer imparts a phase shift onto an optical mode based on an acoustic signal (or some other type of inertial movement). The resulting displacement may be detected and processed similarly to the case for detecting RF signal 180. Thus, each RF-photonic sensor 130 in FIG. 1 may be replaced with a Michelson interferometer, and the RF signal 180 may be considered as a seismic wave detected by the network 120 of Michelson interferometers. Similar to the RF case, the weights or amplitudes of the optical modes may be set to minimize the variance of the estimator for the global property, such that it falls below the SQL.

Other types of (non-RF) distributed sensing applications that could benefit from the present embodiments include gravitational wave detection, rotation measurements (e.g., using a Sagnac interferometer to induce phase displacements on an optical beam), and any other type of physical quantity for which an optical interferometer can couple the physical quantity to an optical mode to impose on it a quadrature displacement.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) An entangled radiofrequency-photonic sensor system includes a quantum circuit for generating a plurality of optical modes that cooperatively form a continuous-variable multipartite entangled state, and a spatially distributed network of radiofrequency-photonic sensors. Each of the radiofrequency-photonic sensors is configured to (i) create, with the radiofrequency signal, a local quadrature displacement on a corresponding optical mode of the plurality of optical modes, and (ii) detect the corresponding optical mode to measure the local quadrature displacement.

(A2) In the system denoted (A1), each of the radiofrequency-photonic sensors may include an electro-optic modulator for phase modulating the corresponding optical mode according to the radiofrequency signal, and two photodetectors arranged to detect the corresponding optical mode via a balanced homodyne measurement.

(A3) In either one of the systems denoted (A1) and (A2), each of the radiofrequency-photonic sensors may include a radiofrequency detector for wirelessly receiving the radiofrequency signal and electrically transmitting the radiofrequency signal to the corresponding electro-optic modulator.

(A4) In any one of the systems denoted (A1) to (A3), the quantum circuit may include a plurality of variable beamsplitters for generating the continuous-variable multipartite entangled state from a single phase-squeezed vacuum state.

(A5) In the system denoted (A4), the system may further include an optical parametric amplifier configured to operate in a parametric amplification regime to generate the single squeezed vacuum state.

(A6) In either one of the systems denoted (A4) and (A5), the plurality of variable beamsplitters may be adjustable such to set an amplitude for each of the plurality of optical modes.

(A7) In the system denoted (A6), the system may further include a post-processor programmed to determine, based on each measured local quadrature displacement and each amplitude, an estimate of a global property of the radiofrequency signal with an uncertainty below the standard quantum limit.

(A8) In the system denoted (A7), the post-processor may be programmed to calculate the estimate as a weighted sum.

(A9) In either one of the systems denoted (A7) and (A8), the global property may be selected from the group consisting of: an amplitude of the radiofrequency signal, and an angle-of-arrival of the radiofrequency signal.

(A10) In any one of the systems denoted (A7) to (A9), the post-processor may be designed to output the estimate.

(B1) A method for entangled radiofrequency-photonic sensing includes generating a plurality of optical modes that cooperatively form a continuous-variable multipartite entangled state. The method also includes, for each optical mode of the plurality of optical modes: (i) transmitting said each optical mode to a corresponding radiofrequency-photonic sensor of a plurality of spatially distributed radiofrequency-photonic sensors, (ii) creating, with a radiofrequency signal at the corresponding radiofrequency-photonic sensor, a local quadrature displacement on said each optical mode, and (iii) detecting, with the corresponding radiofrequency-photonic sensor, said each optical mode to measure the local quadrature displacement.

(B2) In the method denoted (B1), said creating may include phase modulating said each optical mode according to the radiofrequency signal.

(B3) In either one of the methods denoted (B1) and (B2), said detecting may include performing a balanced homodyne measurement of said each optical mode.

(B4) In any one of the methods denoted (B1) to (B3), the method may further include wirelessly receiving the radiofrequency signal at the corresponding radiofrequency-photonic sensor, and electrically transmitting the radiofrequency signal to an electro-optic modulator of the corresponding radiofrequency-photonic sensor.

(B5) In any one of the methods denoted (B1) to (B4), said generating may include adjusting a plurality of variable beamsplitters to generate the continuous-variable multipartite entangled state from a single squeezed vacuum state.

(B6) In the method denoted (B5), the method may further include generating the single phase-squeezed vacuum state with an optical parametric amplifier operating in a parametric amplification regime.

(B7) In either one of the methods denoted (B5) and (B6), said adjusting sets an amplitude for each optical mode. The method may further include determining, based on each measured local quadrature displacement and each amplitude, an estimate of a global property of the radiofrequency signal with an uncertainty below the standard quantum limit.

(B8) In the method denoted (B7), said determining may include calculating a weighted sum.

(B9) In either one of the methods denoted (B7) and (B8), the global property may be selected from the group consisting of: an amplitude of the radiofrequency signal, and an angle-of arrival of the radiofrequency signal.

(B10) In any one of the methods denoted (B7) to (B9), the plurality of radiofrequency-photonic sensors may be linearly spaced with a spacing less than one-half of a wavelength of the radiofrequency signal.

(C1) An entangled photonic sensor system includes a quantum circuit for generating a plurality of optical modes that cooperatively form a continuous-variable multipartite entangled state, and a spatially distributed network of photonic sensors. Each of the photonic sensors is configured to (i) create, with an external signal, a local quadrature displacement on a corresponding optical mode of the plurality of optical modes, and (ii) detect the corresponding optical mode to measure the local quadrature displacement.

(C2) In the system denoted (C1), the external signal may be a free-space radiofrequency (RF) signal, and each of the photonic sensors may be an RF-photonic sensor.

(C3) In the system denoted (C1), the external signal may be an acoustic signal, and each of the photonic sensors may be an optomechanical sensor.

(C4) In the system denoted (C3), the optomechanical sensor may be a Michelson interferometer that phase modulates the corresponding mode according to the acoustic signal.

(C5) In any one of the systems denoted (C1) to (C4), the quantum circuit may include a plurality of variable beamsplitters for generating the continuous-variable multipartite entangled state from a single squeezed vacuum state.

(C6) In the system denoted (C5), the system may further include an optical parametric amplifier configured to operate in a parametric amplification regime to generate the single squeezed vacuum state.

(C7) In either one of the systems denoted (C5) and (C6), the plurality of variable beamsplitters may be adjustable to set an amplitude for each of the plurality of optical modes.

(C8) In the system denoted (C7), the system may further include a post-processor programmed to determine, based on each measured local quadrature displacement and each amplitude, an estimate of a global property of the external signal with an uncertainty below the standard quantum limit.

(C9) In the system denoted (C8), the post-processor may be programmed to calculate the estimate as a weighted sum.

(C10) In either one of the systems denoted (C8) and (C9), the post-processor may be designed to output the estimate.

(D1) A method for entangled photonic sensing includes generating a plurality of optical modes that cooperatively form a continuous-variable multipartite entangled state. The method also includes, for each optical mode of the plurality of optical modes: transmitting said each optical mode to a corresponding photonic sensor of a plurality of spatially distributed photonic sensors; creating, with an external signal received at the corresponding photonic sensor, a local quadrature displacement on said each optical mode; and detecting, with the corresponding photonic sensor, said each optical mode to measure the local quadrature displacement.

(D2) In the method denoted (D1), the external signal may be a free-space radiofrequency (RF) signal, and each of the photonic sensors may be an RF-photonic sensor.

(D3) In the method denoted (D1), the external signal may be an acoustic signal, and each of the photonic sensors may be an optomechanical sensor.

(D4) In the method denoted (D3), the optomechanical sensor may be a Michelson interferometer that phase modulates the corresponding mode according to the acoustic signal.

(D5) In any one of the methods denoted (D1) to (D4), said creating may include phase modulating said each optical mode according to the external signal.

(D6) In any one of the methods denoted (D1) to (D5), said generating may include adjusting a plurality of variable beamsplitters to generate the continuous-variable multipartite entangled state from a single squeezed vacuum state.

(D7) In the method denoted (D6), the method may further include generating the single squeezed vacuum state with an optical parametric amplifier operating in a parametric amplification regime.

(D8) In either one of the methods denoted (D6) and (D7), said adjusting sets an amplitude for each optical mode. The method may further include determining, based on each measured local quadrature displacement and each amplitude, an estimate of a global property of the external signal with an uncertainty below the standard quantum limit.

(D9) In the method denoted (D8), said determining may include calculating a weighted sum.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. An entangled radiofrequency-photonic sensor system, comprising:
    a quantum circuit for generating a plurality of optical modes that cooperatively form a continuous-variable multipartite entangled state; and
    a spatially distributed network of radiofrequency-photonic sensors, each of the radiofrequency-photonic sensors being configured to (i) create, with a radiofrequency signal, a local quadrature displacement on a corresponding optical mode of the plurality of optical modes, and (ii) detect the corresponding optical mode to measure the local quadrature displacement.

2. An entangled photonic sensor system, comprising:
    a quantum circuit for generating a plurality of optical modes that cooperatively form a continuous-variable multipartite entangled state; and
    a spatially distributed network of photonic sensors, each of the photonic sensors being configured to (i) create, with an external signal, a local quadrature displacement on a corresponding optical mode of the plurality of optical modes, and (ii) detect the corresponding optical mode to measure the local quadrature displacement.

3. The entangled photonic sensor system of claim 2, wherein the external signal is a free-space radiofrequency (RF) signal, and each of the photonic sensors is an RF-photonic sensor.

4. The entangled photonic sensor system of claim 2, wherein the external signal is an acoustic signal, and each of the photonic sensors is an optomechanical sensor.

5. The entangled photonic sensor system of claim 2, wherein the optomechanical sensor is a Michelson interferometer that phase modulates the corresponding mode according to the acoustic signal.

6. The entangled photonic sensor system of claim 2, the quantum circuit including a plurality of variable beamsplitters for generating the continuous-variable multipartite entangled state from a single squeezed vacuum state.

7. The entangled photonic sensor system of claim 6, further comprising an optical parametric amplifier configured to operate in a parametric amplification regime to generate the single squeezed vacuum state.

8. The entangled photonic sensor system of claim 2, wherein the plurality of variable beamsplitters are adjustable to set an amplitude for each of the plurality of optical modes.

9. The entangled photonic sensor system of claim 8, further comprising a post-processor programmed to determine, based on each measured local quadrature displacement and each amplitude, an estimate of a global property of the external signal with an uncertainty below the standard quantum limit.

10. The entangled photonic sensor system of claim 9, wherein the post-processor is programmed to calculate the estimate as a weighted sum.

11. The entangled photonic sensor system of claim 9, wherein the post-processor is designed to output the estimate.

12. A method for entangled photonic sensing, comprising:
    generating a plurality of optical modes that cooperatively form a continuous-variable multipartite entangled state; and
    for each optical mode of the plurality of optical modes:
        transmitting said each optical mode to a corresponding photonic sensor of a plurality of spatially distributed photonic sensors;
        creating, with an external signal received at the corresponding photonic sensor, a local quadrature displacement on said each optical mode; and
        detecting, with the corresponding photonic sensor, said each optical mode to measure the local quadrature displacement.

13. The method of claim 12, wherein the external signal is a free-space radiofrequency (RF) signal, and each of the photonic sensors is an RF-photonic sensor.

14. The method of claim 12, wherein the external signal is an acoustic signal, and each of the photonic sensors is an optomechanical sensor.

15. The method of claim 14, wherein the optomechanical sensor is a Michelson interferometer that phase modulates the corresponding mode according to the acoustic signal.

16. The method of claim 12, wherein said creating includes phase modulating said each optical mode according to the external signal.

17. The method of claim 12, wherein said generating includes adjusting a plurality of variable beamsplitters to generate the continuous-variable multipartite entangled state from a single squeezed vacuum state.

18. The method of claim 17, further comprising generating the single squeezed vacuum state with an optical parametric amplifier operating in a parametric amplification regime.

19. The method of claim 17, wherein:
    said adjusting sets an amplitude for each optical mode; and
    the method further comprises determining, based on each measured local quadrature displacement and each amplitude, an estimate of a global property of the external signal with an uncertainty below the standard quantum limit.

20. The method of claim 19, wherein said determining includes calculating a weighted sum.

* * * * *